United States Patent [19]

Martin et al.

[11] Patent Number: 5,658,602

[45] Date of Patent: *Aug. 19, 1997

[54] METHOD AND APPARATUS FOR CONTACT LENS MOLD FILLING AND ASSEMBLY

[75] Inventors: Wallace Anthony Martin, Orange Park; Jonathan Patrick Adams, Jacksonville, both of Fla.; Finn Thrige Andersen, Vedbaek; Ture Kindt-Larsen, Holte, both of Denmark; Jeffrey Eldon Steven, Jacksonville, Fla.; Craig William Walker, Jacksonville, Fla.; Daniel Tsu-Fang Wang, Jacksonville, Fla.; Michael Francis Widman, Jacksonville, Fla.

[73] Assignee: Johnson & Johnson Vision Products, Inc., Jacksonville, Fla.

[*] Notice: The term of this patent shall not extend beyond the expiration date of Pat. No. 5,656,208.

[21] Appl. No.: 431,635

[22] Filed: May 1, 1995

Related U.S. Application Data

[63] Continuation-in-part of Ser. No. 258,264, Jun. 10, 1994.

[51] Int. Cl.⁶ .................................................. B29D 11/00
[52] U.S. Cl. .................... 425/346; 425/451.9; 425/453; 425/808; 425/DIG. 60; 425/405.1
[58] Field of Search .................. 425/808, DIG. 60, 425/346, 405.1, 452, 453, 454, 451.9

[56] References Cited

U.S. PATENT DOCUMENTS

| | | | |
|---|---|---|---|
| 4,402,659 | 9/1983 | Greenbaum | 425/808 |
| 4,422,984 | 12/1983 | Neefe | 425/808 |
| 4,495,313 | 1/1985 | Larsen . | |
| 4,565,348 | 1/1986 | Larsen . | |
| 4,640,489 | 2/1987 | Larsen . | |
| 4,680,336 | 7/1987 | Larsen et al. . | |
| 4,691,820 | 9/1987 | Martinez . | |
| 4,786,444 | 11/1988 | Hwang | 425/808 |
| 4,889,664 | 12/1989 | Kindt-Larsen et al. . | |
| 5,039,459 | 8/1991 | Kindt-Larsen et al. . | |
| 5,080,839 | 1/1992 | Kindt-Larsen . | |
| 5,094,609 | 3/1992 | Kindt-Larsen . | |
| 5,114,629 | 5/1992 | Morland et al. | 425/808 |
| 5,173,100 | 12/1992 | Shigyo et al. | 425/808 |
| 5,192,352 | 3/1993 | Kuwabara et al. | 425/808 |

*Primary Examiner*—James P. Mackey

[57] ABSTRACT

An apparatus for forming contact lenses, wherein front curve mold halves are filled with a hardenable transparent material, such as a polymerizable hydrogel, and back curve mold halves are coupled to the front curve, therein forming a lens. More particularly, the apparatus includes a conveyor for transporting pallets of mold halves to the apparatus, an array of piston structures for raising and aligning the back curves with respect to the filled front curve halves, a mechanism for reciprocating the piston array to couple pairs of front and back curves, and a vacuum chamber for maintaining a vacuum around the curves during coupling. In addition, there is provided individual spring biasing to each reciprocating element whereby sensitivity to thickness variations and pallet misfeeds may be minimized. Further, there is provided a vacuum sleeve, through which the pistons reciprocate within the vacuum chamber, which sleeve preserves the vacuum within the chamber.

21 Claims, 19 Drawing Sheets

METHOD AND APPARATUS FOR CONTACT LENS MOLD FILLING AND ASSEMBLY

This application is a continuation-in-part of U.S. application Ser. No. 08/258,264 Jun. 10, 1994.

BACKGROUND OF THE INVENTION

1. Field of the Invention

The present invention relates generally to an apparatus and method for filling and assembling molds used in the production of contact lenses, and more particularly, for filling and assembling a mold having a polymerizable hydrogel therein, under vacuum, to form a soft contact lens.

2. Discussion of the Prior Art

U.S. Pat. No. 4,564,348 to Larsen, now assigned to the assignee of the present invention, discloses plastic molds for manufacturing a plurality of soft contact lenses in a continuous or semicontinuous method of operation. A mold assembly having a plurality of mold units is filled with a polymerization mixture in a first dosing step, and the mold units are then covered with a convex mold member or lid as shown in FIG. 5, and the lids are brought to rest on the concave mold members properly aligned and without distortion. The lids are free to float and align themselves on the pool of polymerizable mixture held in the concave mold.

U.S. Pat. No. 4,640,489, also to Larsen, now assigned to the assignee of the present application, discloses a mold for making contact lenses wherein one of the two mold sections is relatively more flexible than the other. In addition, a number of mold constructions known to the prior art are discussed in the background portion of the specification of this patent.

U.S. Pat. No. 4,495,313, also to Larsen, and now assigned to the assignee of the present application, discloses a mold assembly in which shrinkage of the monomer mixture during polymerization creates a negative pressure which aligns the upper mold half and draws excess monomer into the cavity.

In the commercial application of the invention described in U.S. Pat. No. 4,640,489 it has been found advantageous to weight the upper male portion of the mold cavity with a fixed weight subsequent to assembly to seat the upper male mold half and to displace any excess monomer in the mold cavity into a space between the flanges, as illustrated in FIG. 1 of that patent, to form a HEMA ring which is preferentially adhered to the upper or male portion of the mold cavity by a corona discharge treatment of a portion of the male mold.

SUMMARY OF THE INVENTION

The present invention is an apparatus and a method for filling and assembling contact lens molds with a polymerizable monomer or monomer mixture to form a soft contact lens. More particularly, a method and apparatus is disclosed for filling a contact lens mold with a polymerizable monomer or monomer mixture, and then assembling the mold parts under vacuum with a predetermined preload to insure the air or other gases are not trapped in the mold cavity with the monomer or monomer mixture.

It is an object of the present invention to provide an apparatus for filling and assembling mold parts for a contact lens which includes a first automated station for receiving a plurality of front curve contact lens mold parts, carried in a unique carrier, which are then filled with a predetermined amount of polymerizable monomer or monomer mixture. The apparatus also includes a second automated station which provides a coating of surfactant on a portion of the front curve lens mold part to provide for preferential adhesion of any excess monomer or monomer mixture to a back curve mold part. The apparatus further includes a third automated station for sequentially receiving a plurality of back curve mold parts, carried by a unique carrier, removing the back curve mold parts from the carrier, and then receiving and registering the plurality of front curve mold parts which were previously filled with the polymerizable monomer or monomer mixture. A vacuum is first drawn about the mold parts, and then the back curve is assembled with the front curve to displace excess monomer or monomer mixture from the mold cavity. The assembly is accomplished under vacuum to speed the assembly of the mold and to avoid the formation of gas bubbles from any gasses that might otherwise be trapped between the mold parts at the time of mold assembly.

It is a further object of the present invention to provide for the assembly of a plurality of front curve mold parts in a single assembly step wherein each of the mold parts are separately and independently biased from a cold air plenum to provide independent reciprocation with respect to each mold part while clamping each back curve to its associated front curve with a common predetermined pressure.

It is further an object of the present invention to provide for dosing of a degassed monomer or monomer mixture in the front mold cavity wherein said dosing is carried out under vacuum or low atmospheric pressure conditions to thereby prevent the entrapment of gas under the monomer, or to prevent the formation of gas bubbles therein which might otherwise arise from the release of the pump pressure used to convey the monomer at the time the monomer is dosed.

It is another object of the present invention to provide for the assembly of a large number of small independent mold parts at a high production rate with precise registration of the front and back curve mold parts.

It is another object of the present invention to provide an apparatus in which a polymerizable hydrogel is pumped to a plurality of lens molds formed of a first concave or front curve mold half, and a second convex or back curve mold half. The mold halves are formed from polystyrene or other material transparent to actinic radiation. The second or convex mold half may be thinner than the first or concave mold half to enable mold compliance in the event the mold halves are clamped together. Clamping pressure may be used to align the flanges formed on the first and second mold halves to insure that the flanges are parallel and that the respective curves of the mold are aligned. Clamping pressure may also be applied to seat the sealed mold half against an annular edge formed in the first mold half to essentially sever any excess monomer from the monomer contained within the mold. All of the foregoing is accomplished, under vacuum, at a high production rate or volume.

It is another object of the present invention to prevent the entrapment or formation of gas bubbles within the polymerizable hydrogel prior to polymerization.

It is another object of the present invention to provide an adjustable means for varying the clamping pressure as the first and second mold halves are clamped together. Said adjustable means further including means for independent reciprocation with respect to each mold part while clamping each back curve to its associated front curve with a common predetermined pressure. In a first embodiment, the independent reciprocation is achieved with a common air plenum which provides a force biasing to each of the mold parts. In a second embodiment this independent reciprocation is achieved through the use of individual biasing springs having appropriate spring constant strengths.

It is also an object of the present invention to provide an assembly having vacuum sealing structures through which elements of the assembly having normal manufacturing variances in dimension may be reciprocated while maintaining a stable vacuum.

BRIEF DESCRIPTION OF THE DRAWINGS

The foregoing objects and advantages of the present invention filling and assembling mold parts for contact lens may be more readily understood by one skilled in the art with reference to the following detailed description of the preferred embodiments, taken in conjunction with the accompanying drawings wherein like elements are designated by identical reference numerals throughout the several views.

DETAILED DESCRIPTION OF THE PREFERRED EMBODIMENT

Figure 3:
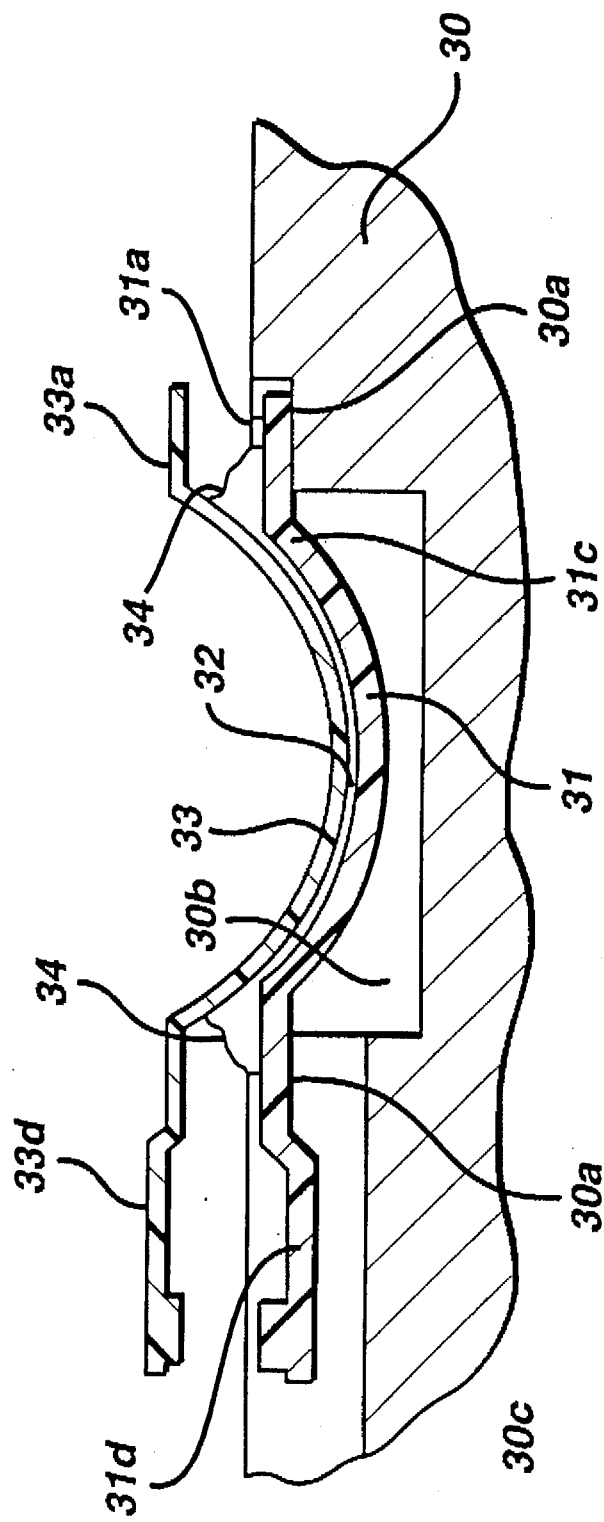
FIG. 3 is a cross-section view of an assembled mold as carried in the carrier illustrated in FIG. 2.

The present invention is useful in a process for forming soft contact lenses from a polymerizable monomer or monomer mixture. The soft contact lenses are formed in a mold assembly having a first concave and a second convex mold half. As illustrated in FIG. 3, the mold halves are formed of polystyrene transparent to visible and ultraviolet light, with a central curved section defining a concave surface 31, a convex surface 33 and circular circumferential edge 31(c), and integral with said edge an annular essentially uniplanar flange 31(a). At least a part of the concave surface 31 and the convex surface 33 have the somewhat diminished dimensions of the front or back curves, respectively of a contact lens to be produced in the mold assembly, and are sufficiently smooth that the surface of the contact lens formed by polymerization of said polymerizable composition in contact with the surface is optically acceptable. The mold is thin enough to transmit heat rapidly therethrough and has rigidity sufficient to withstand prying forces applied to separate the mold halves during demolding.

A common defect in contact lenses formed in accordance with this process is the inclusion of air bubbles which are trapped between the monomer and the mold at deposition.

In the present invention, the monomer is degassed prior to pumping as more particularly described in U.S. patent application U.S. Ser. No. 08/212,264, filed Mar. 11, 1994, and, entitled Method and Apparatus for Making an Ophthalmic Lens, assigned to the assignee of the present invention, the disclosure of which is incorporated herein by reference thereto. This process removes part of the dissolved gasses present in the monomer mixture prior to the pumping of the monomer to the deposition or filling nozzle into the front curve mold half can optionally be done under vacuum to insure that no gasses are trapped between the monomer and the front lens mold as the monomer is deposited.

The complimentary pair of first 31 and second 33 mold halves which define the shape of the final desired lens are used to direct mold the monomer mixture wherein the mixture is dissolved in a nonaqueous water displacable solvent as described in U.S. Pat. Nos. 4,680,336, 4,889,664 and 5,039,459. After the deposition or dosing step, in which the front concave mold half 31 is substantially filled with a polymerization mixture 32, the concave front mold half 31 is covered with a base mold half 33 under a vacuum to ensure that no air bubbles are trapped between the mold halves.

The first and second mold halves may then be clamped together in the assembly step to displace any surplus monomer from the mold area and to properly align the mold halves by alignment of the mold flanges.

Following this mold assembly and clamping step, the first and second mold halves are then clamped together a second time in a precure step wherein the polymerization mixture is exposed to actinic light, preferably from a UV lamp, while the mold halves are clamped. Typically, the mold halves are clamped for approximately 40 seconds with 30 seconds of actinic radiation. At the completion of the precure step, the polymerization mixture has formed a partially polymerized gel, with polymerization initiated throughout the mixture.

Following the precure step, the monomer/solvent mixture is then cured in a UV oven whereby polymerization is completed in the monomer(s). This irradiation with actinic visible or ultraviolet radiation produces a polymer/solvent mixture in the shape of the final desired hydrogel lens. After the polymerization process is completed, the two halves of the mold are separated in a demolding step leaving the contact lens in the first or front curve mold half, from which it is subsequently removed. The front and base curve mold halves are typically used for a single molding and then disposed of or discarded. After the demolding step, the solvent is displaced with water to produce a hydrated lens which when fully hydrated and buffered will be the final shape and size of the lens. In most cases, this is nominally 10% larger than the original molded polymer/solvent article.

The compositions to which this process may be directed include copolymers based on 2-hydroxyethyl methacrylate ("HEMA") and one or more comonomers such as 2-hydroxyethyl acrylate, methyl acrylate, methyl methacrylate, vinyl pyrrolidone, N-vinyl acrylamide, hydroxypropyl methacrylate, isobutyl methacrylate, styrene, ethoxyethyl methacrylate, methoxy triethyleneglycol methacrylate, glycidyl methacrylate, diacetone acrylamide, vinyl acetate, acrylamide, hydroxytrimethylene acrylate, methoxyethyl methacrylate, acrylic acid, methacryl acid, glyceryl methacrylate, and dimethylamino ethyl acrylate.

Preferred polymerizable compositions are disclosed in U.S. Pat. No. 4,495,313 to Larsen, U.S. Pat. No. 5,039,459 to Larsen et al. and U.S. Pat. No. 4,680,336 to Larsen et al., the disclosures of which are hereby incorporated herein by reference. Such compositions comprise anhydrous mixtures of a polymerizable hydrophilic hydroxy ester of acrylic acid or methacrylic acid and a polyhydric alcohol, and a water displaceable ester of boric acid and a polyhydroxyl compound having preferably at least 3 hydroxyl groups. Polymerization of such compositions, followed by displacement of the boric acid ester with water, yields a hydrophilic contact lens. The mold assembly of the present invention described herein may be used to make hydrophobic or rigid contact lenses, but the manufacture of hydrophilic lenses is preferred.

The polymerizable compositions preferably contain a small amount of a cross-linking agent, usually from 0.05 to 2% and most frequently from 0.05 to 1.0%, of a diester or triester. Examples of representative cross linking agents include: ethylene glycol diacrylate, ethylene glycol dimethacrylate, 1,2-butylene dimethacrylate, 1,3-butylene dimethacrylate, 1,4-butylene dimethacrylate, propylene glycol diacrylate, propylene glycol dimethacrylate, diethylglycol dimethacrylate, dipropylene glycol dimethacrylate, diethylene glycol diacrylate, dipropylene glycol diacrylate, glycerine trimethacrylate, trimethylol propane triacrylate, trimethylol propane trimethacrylate, and the like. Typical cross-linking agents usually, but not necessarily, have at least two ethylenically unsaturated double bonds.

The polymerizable compositions generally also include a catalyst, usually from about 0.05 to 1% of a free radical catalyst. Typical examples of such catalysts include lauroyl peroxide, benzoyl peroxide, isopropyl percarbonate, azobisisobutyronitrile and known redox systems such as the ammonium persulfate-sodium metabisulfite combination and the like. Irradiation by ultraviolet light, electron beam or a radioactive source may also be employed to catalyze the polymerization reaction, optionally with the addition of a polymerization initiator. Representative initiators include camphorquinone, ethyl-4-(N,N-dimethylamino)benzoate, and 4-(2-hydroxyethoxy)phenyl-2-hydroxyl-2-propyl ketone.

Polymerization of the polymerizable composition in the mold assembly is preferably carried out by exposing the composition to polymerization initiating conditions. The preferred technique is to include in the composition initiators which work upon expose to ultraviolet or visible radiation; and exposing the composition to ultraviolet or visible radiation of an intensity and duration effective to initiate polymerization and to allow it to proceed. For this reason, the mold halves are preferably transparent to ultraviolet or visible radiation. After the precure step, the monomer is again exposed to ultraviolet or visible radiation in a cure step in which the polymerization is permitted to proceed to completion. The required duration of the remainder of the reaction can readily be ascertained experimentally for any polymerizable composition.

After the polymerizable composition has polymerized, the mold assembly is disassembled to permit further processing of the polymerized product into a contact lens (such processing including e.g. washing and hydrating, packaging and sterilizing of the lens). Preferably, the flanges of the front and base mold halves are gripped and pulled away from each other, either in directly opposite directions or through an angle in a prying motion. Advantageously, the assembly is first heated moderately to facilitate separation of the polymerized article from the mold half surfaces.

Method of Operation

Figure 1:
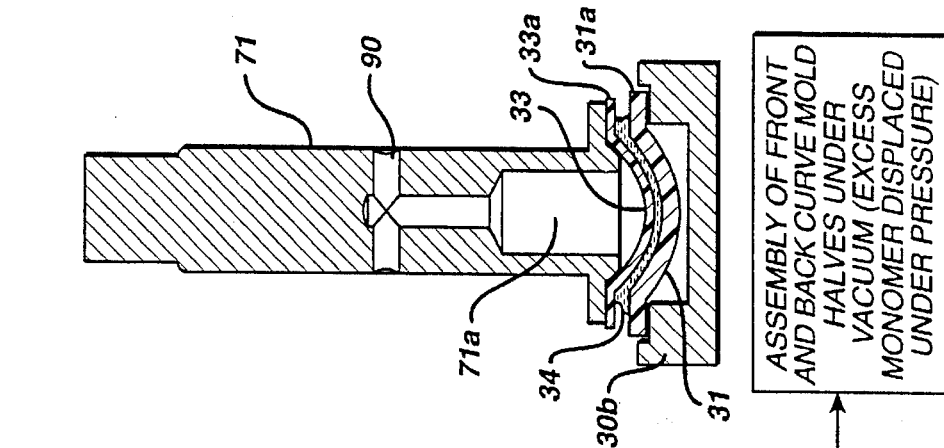
FIGS. 1(a)–1(d) is a diagrammatic and illustrated flow diagram of the method of the present invention.
FIG. 1(e) is a block diagram flow chart of the process of the present invention.

FIG. 1(e) is a block diagram of the method of the present invention and FIGS. 1(a)–(d) are diagrammatic illustrations of the method of the present invention. As illustrated in FIG. 1(a), specialized carriers or pallets 30 are fed to the deposition and assembly stations carrying, on alternate pallets, front curve mold halves and back curve mold halves. As will be more fully described with respect to FIG. 4, the pallets arrive in alternating sequence with the pallet containing back curve halves first in sequence, followed immediately thereafter by a pallet loaded with front curve mold halves. These pallets are then conveyed into the filling and mold assembly stations sequentially at the rate of approximately 1 pallet each 6 seconds.

As illustrated in FIG. 1(a), a predetermined amount of the polymerizable hydrogel or monomer 10 is deposited in a front curve mold half by means of a precision dosing nozzle 142, which is part of the dosing or filling station 50. The monomer may be dosed under vacuum in each of the front curve mold halves, carried in the alternating pallets, to avoid the possibility of entrapping any gasses between the monomer and the front curve mold half 31. Further, as will be further described with respect to FIG. 6, the polymerizable monomer mixture may be degassed to insure that significant dissolved gasses are not present in the monomer inasmuch as dissolved gasses may well form bubbles as the monomer is exposed to vacuum conditions.

In the preferred embodiment of the invention, approximately 60 μl of polymerizable hydrogel or monomer is deposited in the front curve mold half to insure that the mold cavity is overdosed, in order to avoid the possibility of incomplete molding. The excess monomer is removed from the mold cavity in the final step of the assembly of the front and back curve mold halves as will be hereinafter described.

The second station in the apparatus for depositing and assembling the mold parts is a stamping station schematically illustrated in FIG. 1(b), and more fully described in U.S. Ser. No. 08/258,263, filed Jun. 10, 1994, and, entitled Method and Apparatus For Applying a Surfactant to Mold Surfaces, also assigned to the assignee of the present invention. As illustrated in FIG. 1(b), the annular flange 31(a) surrounding the front curve mold half is stamped via stamp pad 21 with a thin film of surfactant which has been found useful in removing the excess monomer displaced from the mold cavity at the time of assembly. The excess monomer (when hydroxyethylmethacrylate is used, it is referred to as "HEMA") is displaced between the flanges 31(a) and 33(a), as illustrated in FIG. 1(d) to form a ring 34 of excess HEMA at the time of mold assembly. This HEMA ring is also cured contemporaneously with the polymerizable hydrogel that forms the contact lens 32.

By stamping the front curve mold flange 31(a) with a mold release surfactant, the HEMA ring 34 preferentially adheres to the back curve mold half flange 33(a) and is removed from the production line at the time the back curve mold half is removed at mold disassembly. In the preferred embodiment, the mold release surfactant is a polyethylene oxide sorbitan mono-oleate, commercially sold under the trade name "Tween 80".

The stamping head station 60 includes mounted therein a plurality of stamps 21 each adapted to be moved in vertical reciprocatory movement in a coordinated matter by pistons 22 mounted in the stamping head station 60, wherein the number of stamps 21 is correlated with the number of front curves 31 carried by mold pallet 30.

Adapted to be positioned in spaced relationship below the lower end of each stamp 21 when the stamp is in a raised position, is a horizontally shiftable pad member (not shown) which is constituted of a suitable porous material, such as porous polyethylene having an average 10 micron pore size, and which is impregnated with a solution containing a surfactant, the latter of which may be present in a highly concentrated state. The upper surface of the pad member is covered by a filter, preferably of nylon, having a mesh size of 1.2 microns so as to act as a metering device and allow only relatively small quantity of surfactant to pass therethrough as the surfactant is wicked from the bottom of the pad member to the top upon the pad member being pressingly contacted by the bottom ends of the stamping heads 21.

The method of operation of the assembly station will be hereinafter described with respect to FIGS. 1(c)–1(d) and FIGS. 7 and 14. As pallets 30 containing the back curve mold halves 33, which are first in the alternating sequence, enter the assembly station, a plurality of reciprocating vacuum grip pistons 71 are reciprocated downwardly, as will be more fully described with respect to two primary embodiments of this invention which are illustrated in FIGS. 8–13 and 14–17 respectively, to pick up the back curve mold halves from the first of the alternating pallets 30. The back curve mold halves are lifted by means of a vacuum drawn in chamber 71(a), shown here in an embodiment corresponding to the first primary embodiment, which secures the back curve mold half to the reciprocating piston 71. After the back curve pick up, the empty back curve pallet 30 is advanced, and a second pallet containing the front curve mold halves and monomer is advanced under the reciprocating piston as illustrated in FIG. 1(d). A vacuum is then drawn around the entire assembly to insure that no gasses are trapped between the mold halves and the monomer at the time the mold is assembled. The reciprocating piston 70 is then driven downwardly so that the back curve mold half 33 contacts the monomer and displaces it throughout the mold cavity. As the reciprocating piston 71 continues to descend downwardly, the excess monomer overflows the cavity. Optionally the reciprocating action of the piston may descend far enough to seat the flat annular surface 33(a) of back curve mold half 33 against the circumferential parting edge 31(c) of the front curve mold half, thereby aligning the mold parts and displacing the excess monomer into the space between the flanges 31(a), 33(a) in which forms the excess HEMA ring 34. The back curve mold half may then be clamped to the front curve mold half by means of a floating over travel mechanism that will be hereinafter explained in detail with respect to FIGS. 8(a) and 8(b) for the first embodiment and FIG. 16 for the second embodiment. After a predetermined period, the vacuum in chamber 71(a) is broken but the clamping pressure from piston 21 is retained during overtravel of the assembly module. Then the vacuum surrounding the assembled mold halves and reciprocating piston 71 is broken, and reciprocating piston 71 is retracted thereby allowing pallet 30 to be transferred out of the assembly station to the precure station.

Figure 7:
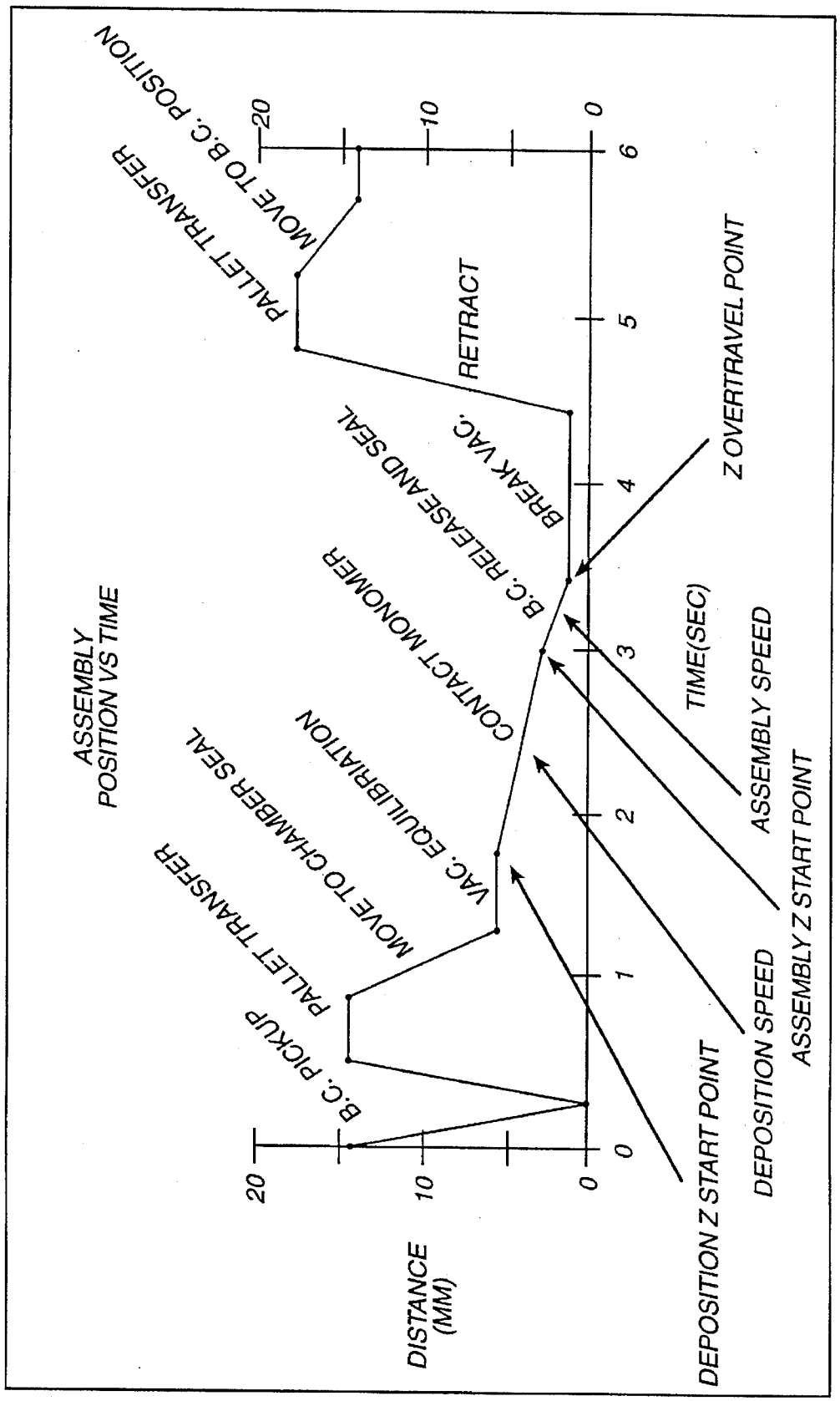
FIG. 7 is a diagrammatic time line illustration of the assembly step of one embodiment of the present invention.
Figure 14:
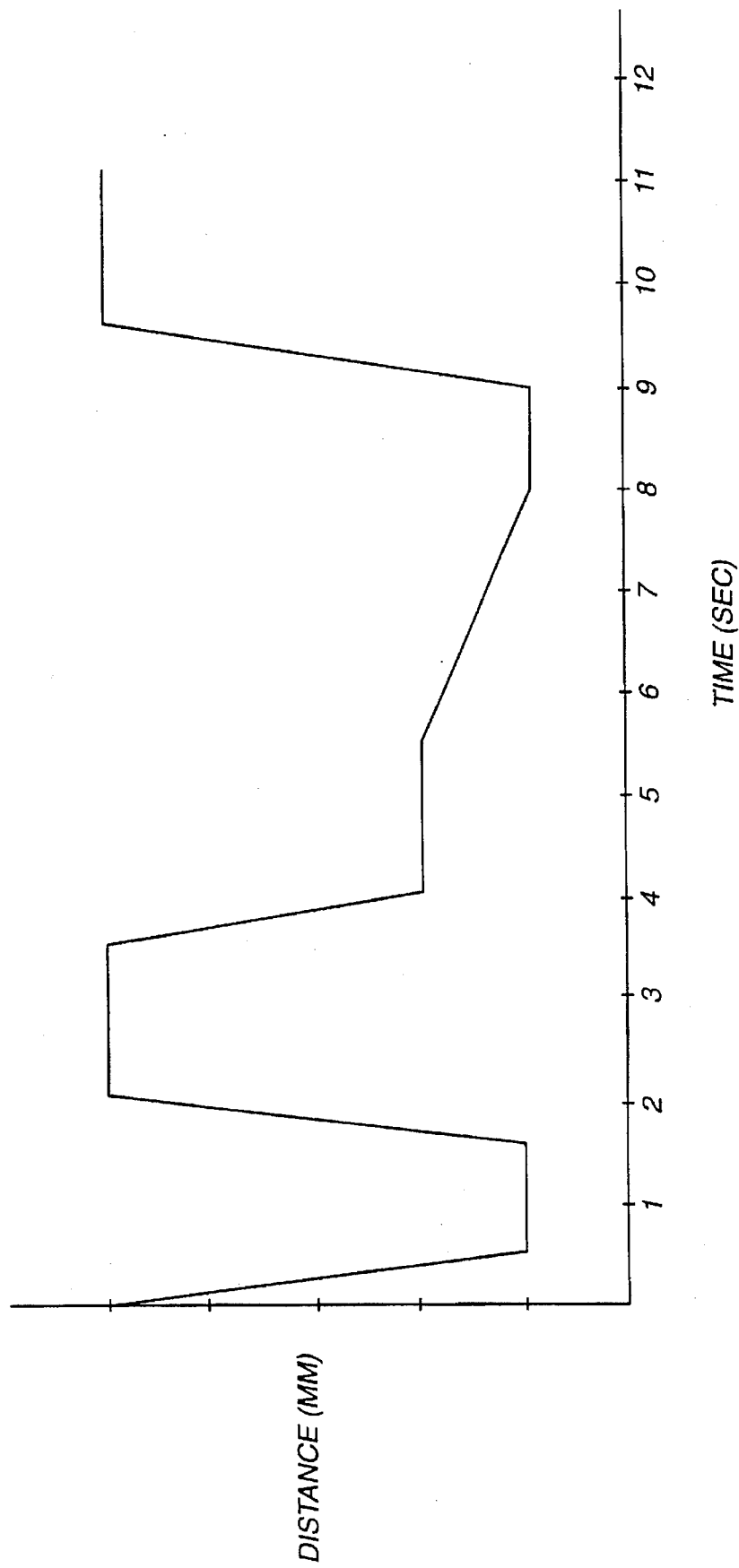
FIG. 14 is a time chart and diagrammatic time line illustration of the assembly steps of a second embodiment of the present invention.

The assembly of the mold halves according to each of the two disclosed embodiments of the present invention are also described in the charts illustrated in FIGS. 7 and 14 in which the position of reciprocating piston 71 is plotted as a function of time.

As illustrated in FIG. 7 with respect to the first embodiment, at the zero start point, the reciprocating piston 71 begins to descend for the back curve pick up, and reaches and secures the back curve in approximately 0.25 seconds. The piston 70 is then reciprocated upwardly to its upper position 14 mm above pallet 30 in approximately 0.25 seconds. Then, the pallets are advanced wherein the back curve mold half pallet is removed and the front curve mold half pallet is inserted, which transfer takes approximately 0.5 seconds. While the pallets are being transferred, a vacuum chamber begins its descent towards the front curve mold pallet 30 and contacts the mold pallet to establish a seal between the chamber and the pallet as will be hereinafter more fully described with respect to FIG. 8. A seal is established at approximately 1.25 seconds after the zero point, and the nitrogen in the chamber is then evacuated until a vacuum equilibrium is reached at approximately 1.75 seconds.

It should be noted that the reciprocating piston 71 is carried within the vacuum chamber so that as the vacuum chamber descends and seals to the pallet, the reciprocating piston 71 and the back curve mold half 33 have been partially lowered to approximately 5 mm above the front curve mold half. At 1.75 seconds, the reciprocating piston 71 begins independent downward travel and contacts the monomer at approximately 2.5 seconds after the zero point. Downward travel of the reciprocating piston continues and at approximately 3 seconds, the back curve mold half is firmly seated on the parting edge 31(c) of the front curve mold half indicating formal assembly. Shortly thereafter, the vacuum in chamber 71(a) is broken, but the reciprocating piston 71 maintains a downward force on the back curve mold half while the remainder of the assembly module continues a downward travel to establish an independent floating clamping of the back curve mold halves against a front curve. At approximately 3.4 seconds, the vacuum is broken in the vacuum chamber, and at approximately 4.4 seconds the reciprocating piston 71, the vacuum chamber and the assembly module begin to retract. At 4.75 seconds, the pallet containing the assembled mold halves is transferred out of the assembly station, and a new pallet containing the back curve mold halves is inserted under the mold assembly module. At approximately 5 seconds, the reciprocating piston 71 is then moved to its back curve pick up position, and at 6 seconds, the assembly begins anew at the zero start point.

The assembly time—motion chart according to FIG. 14, which corresponds to the second embodiment, begins at the zero time—start point with the reciprocating pistons initiating a descent toward the back curve pallet, making contact with the back curve mold halves in approximately 0.5 seconds. The pistons are coupled to a primary support beam, the motion of which raises and lowers the pistons coupled to it. A vacuum chamber housing is also coupled to the primary support beam and is raised and lowered accordingly.

The pistons remain positioned at the back curve pallet for approximately 1.0 seconds during which time the vacuum grips of the pistons are engaged to secure the back curve mold halves to their respective pistons. The pistons and the secured back curves are then reciprocated upwardly to a raised position above pallet 30 in approximately 0.5 seconds. The pistons remain in this raised position for approximately 1.5 seconds as the pallets are advanced so that the back curve pallet is removed, and such that the front curve pallet is aligned beneath the piston array. This pallet advance takes approximately 1.5 seconds.

Once the pallet of front curve mold halves has been positioned, the pistons and vacuum chamber (each of which are coupled to the primary support beam) begin to descend toward the front curve mold pallet, to which pallet the vacuum chamber will establish a seal as will be hereinafter more fully described with respect to FIG. 15. The sealing of the vacuum chamber to the pallet is established approximately 0.5 seconds after the pistons and vacuum chamber begin their descent toward the front curves, which seal is established by the O-rings of the vacuum chamber being compressed against the pallet surface. A vacuum pump evacuates the nitrogen from the chamber and the desired vacuum pressure is reached in approximately 1.5 seconds (2.0 seconds after the initial descent of the pistons and vacuum chamber).

The vacuum chamber is connected to the primary support beam with sliding support shafts, each shaft having a corresponding biasing spring, which sliding shafts permit the primary support beam, and the pistons coupled thereto, to continue descending once the vacuum chamber has seated to the pallet. After 2.0 seconds of descent, approximately contemporaneous with the complete establishment of the vacuum in the vacuum chamber, the back curve mold halves which are attached to the pistons contact the monomer in the front curve mold halves. For approximately 1.5 seconds the reciprocating pistons continue their downward travel at a slower rate, until the back curve mold half is firmly seated on the parting edge of the front curve mold half indicating formal assembly. During the downward travel through the monomer, the vacuum in the piston is broken, but the piston continues to drive the back curve toward its seating against the front curve. The final descent through the monomer proceeds at a slower speed to permit the monomer to flow laterally and upwardly between the closing halves, to partially fill the region between the two halves, and to allow the excess monomer to escape the front curve and to form a HEMA ring around the lip of the curve. This HEMA ring is separated from the molded monomer lens at the parting edge of the mold assembly by the coupling of the two curve halves.

During the approximately 1.0 second after the back curve half has seated and the primary support beam stops descending, the vacuum within the chamber is broken. During this 1.0 second, however, the piston and primary support beam remain stopped therein maintaining a constant downward clamping force on the back curve mold half. After the 1.0 second pause, the primary support beam, the pistons, and the vacuum chamber are sequentially raised upward in approximately 0.5 seconds. Subsequent to this retraction, the pallet of assembled molds begins to advance and is transferred away from the assembly. At this same time a new pallet of back curves is advanced under the assembly station and the process begins anew.

The Filling Apparatus

Figure 4:
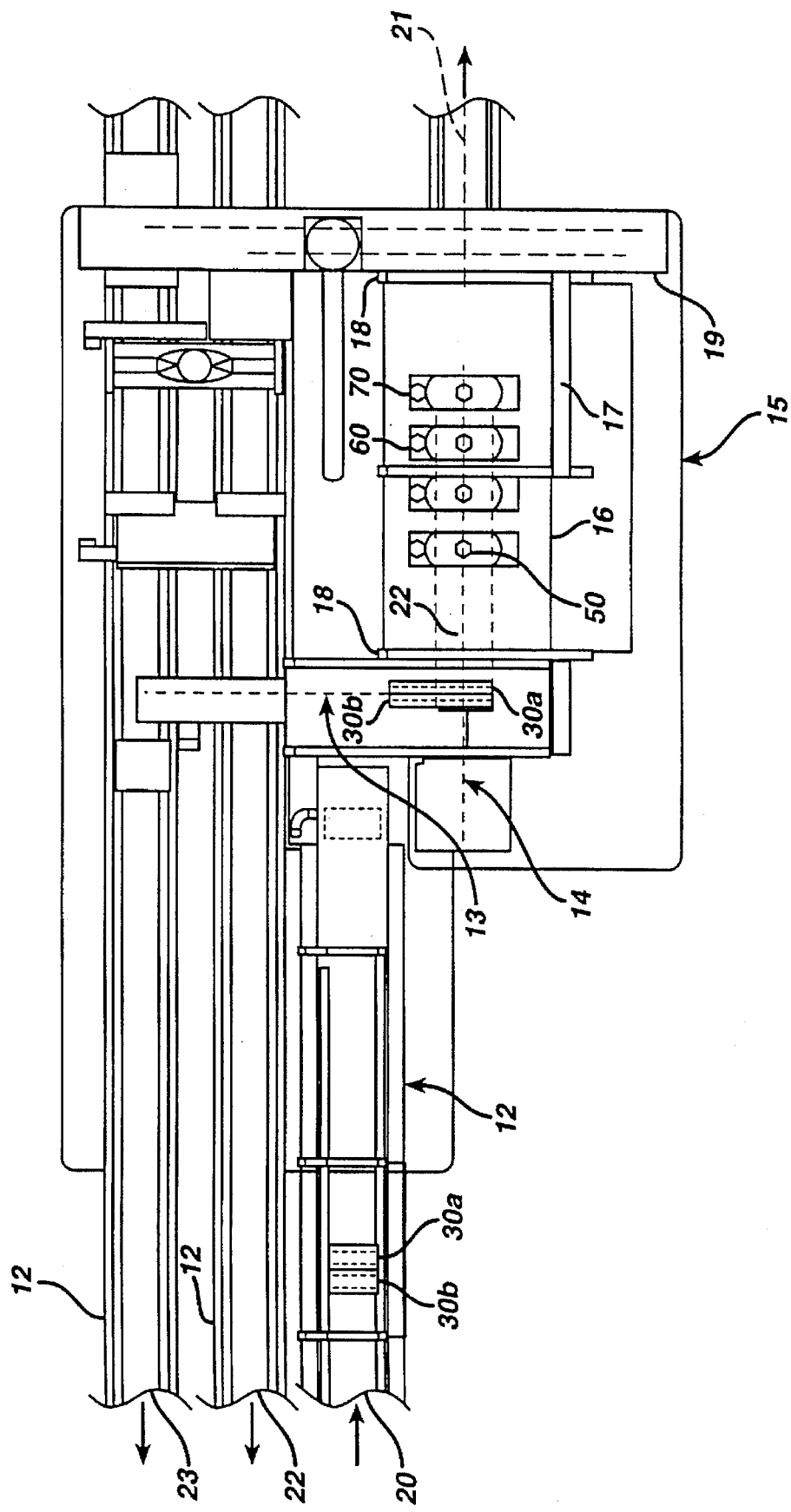
FIG. 4 is a diagrammatic top plan view of the filling and assembly stations of one embodiment of the present invention.

The present invention is illustrated in plan view in FIG. 4 in which conveyor 20 provides a sequenced supply of alternating pallets two of which are schematically illustrated in FIG. 4 as 30(a) and 30(b). In an exemplary embodiment of the invention, pallet 30(a) contains 8 back curve mold parts and pallet 30(b) contains 8 front curve mold parts. These pallets travel on conveyor 20 in a nitrogen tunnel 12 which surrounds each of the conveyors and material handling devices to provide a low oxygen environment for all of the component parts prior to polymerization. Material handling pallet pushers 13 and 14 direct the pallets from conveyor belt 20 to the filling and assembly station 15, which is also enclosed within a nitrogen enclosure 16. Enclosure 16 may be pivoted up and out of the way for servicing via means of handle 17 and hinges 18. Within the filling and assembly station 15 there is the filling or dosing assembly 50 for filling the front curves with a predetermined precision dose of monomer, an apparatus 60 for applying a mold release surfactant to the flange area of the front curve molds, and the mold assembly station 70. Following assembly, the empty back curve mold pallets are returned by material handling pusher 19 to the back curve pallet return conveyor 22, while the filled and assembled mold assemblies are conveyed in their respective pallet via conveyor 21 to the precure station.

The material handling apparatus 14 is a precision device which pushes the pallets one at a time onto track 22 to be processed by the various stations in the deposition and assembly apparatus. The pallets are advanced serially, with each advance stroke being the width of the pallet ±0.1 mm. This enables placement of the pallets for precision registration in the various modules of the filling and assembly station 15.

Figure 5:
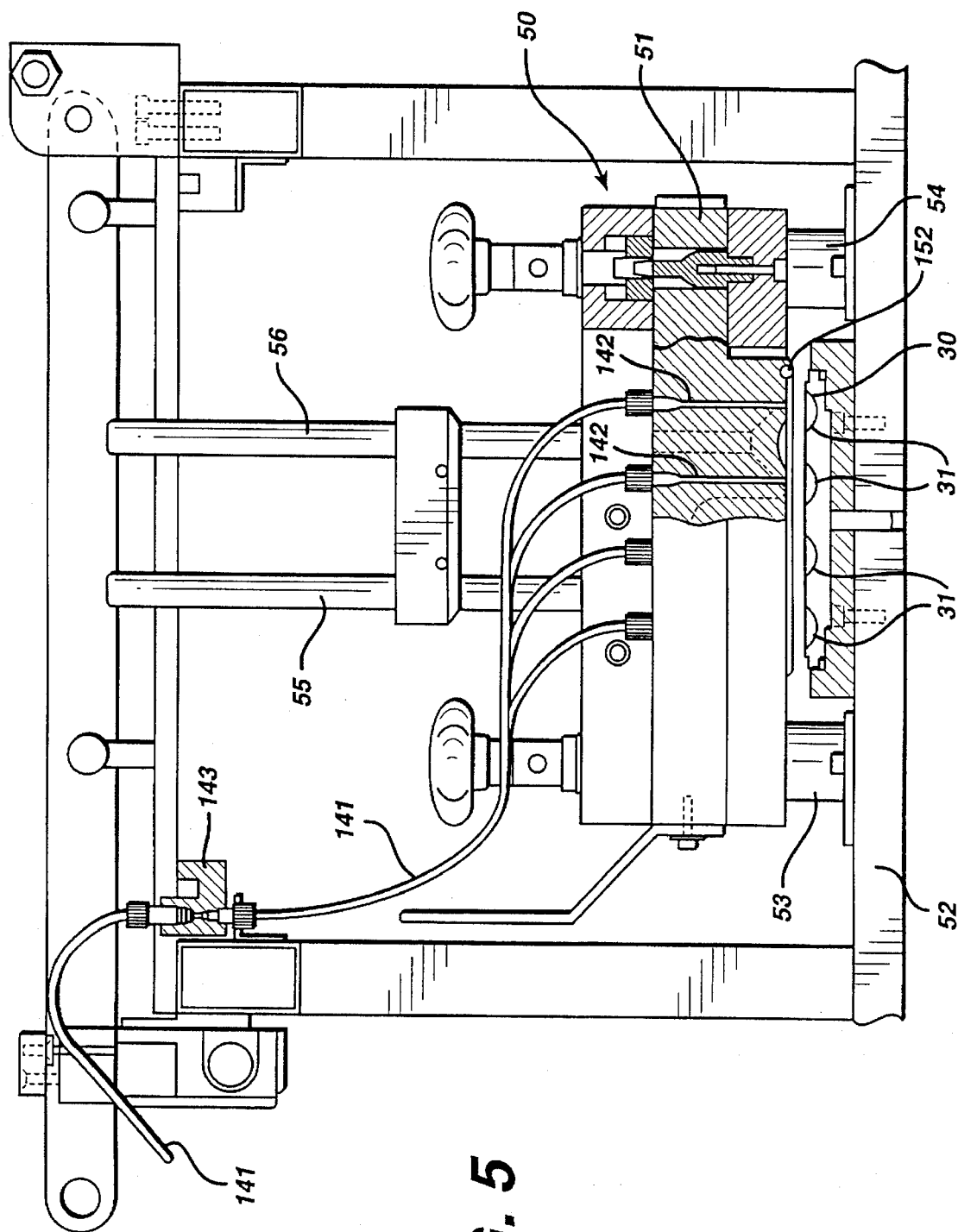
FIG. 5 is a partially cross-sectioned side view of the filling station used for depositing a predetermined amount of monomer in each of the mold cavities.
Figure 6:
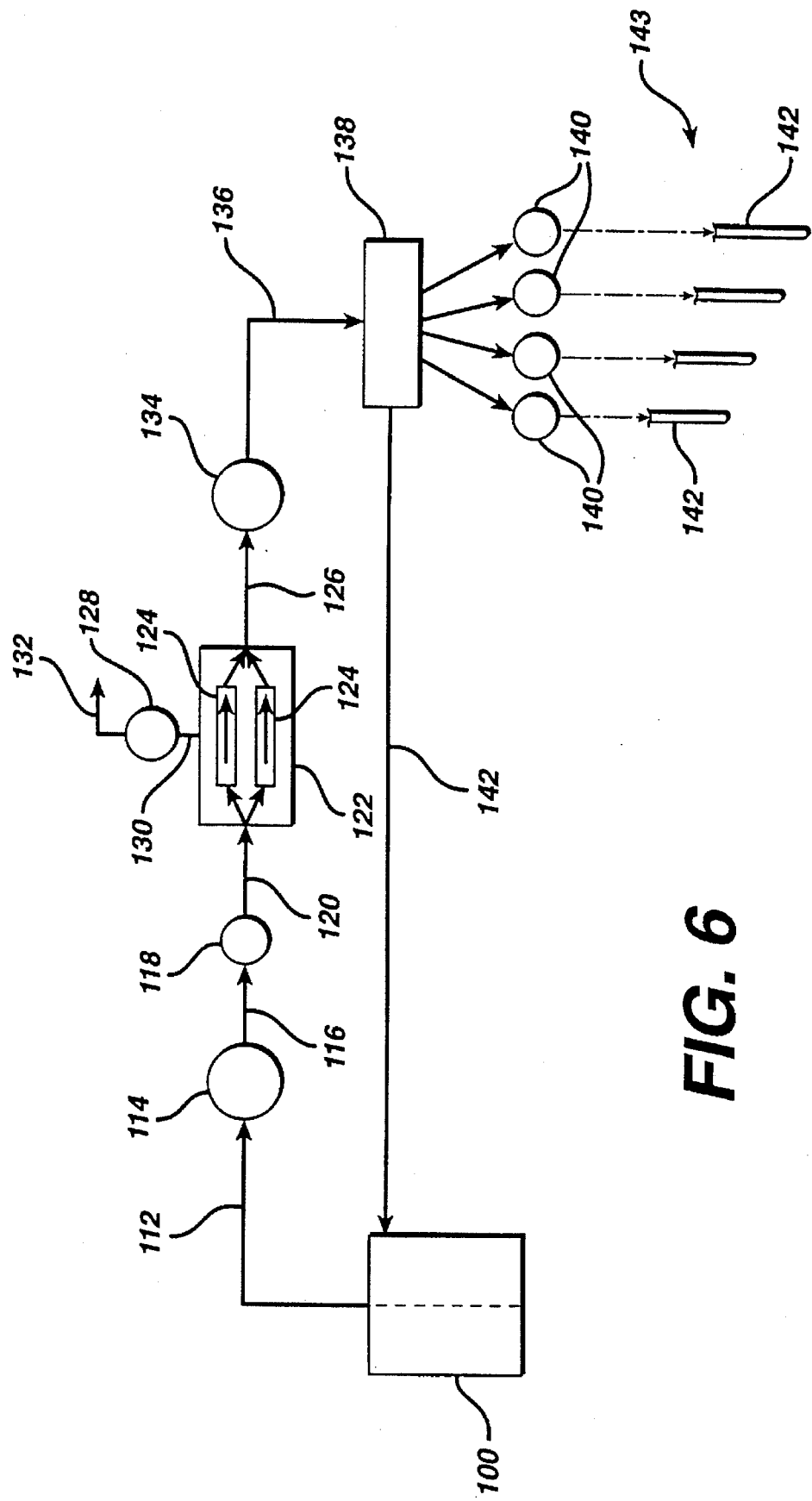
FIG. 6 is a simplified diagrammatic view of a monomer degassing and pumping system utilized in the present invention.
Figure 9:
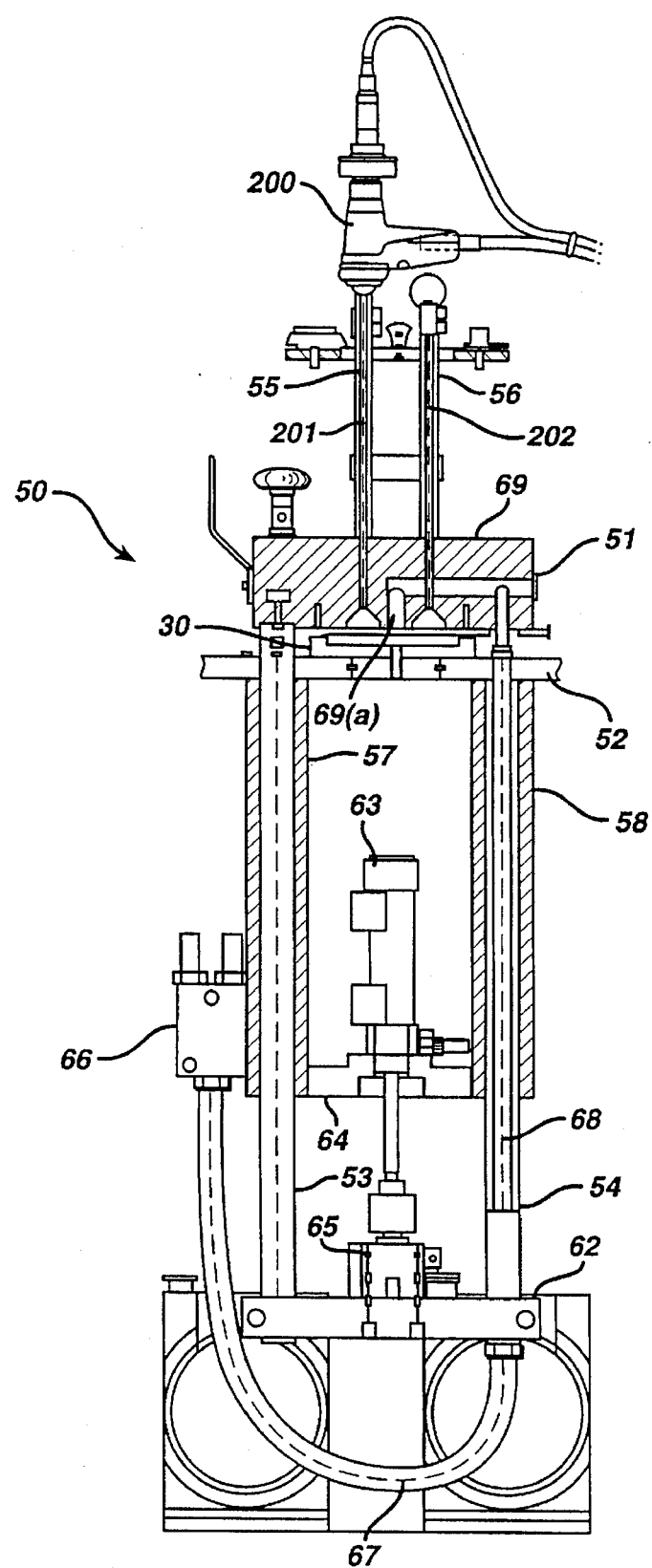
FIG. 9 is a diagrammatic and partially cross-sectioned illustration of the dosing or filling station of one embodiment of the present invention illustrating the vacuum interconnections to the reciprocating filling module.

The filling or dosing station 50 will be hereinafter described with respect to FIGS. 5, 6 and 9, wherein FIGS. 5 and 9 are partially cross-sectioned views of station 50 and FIG. 6 is a schematic illustration of the monomer degassing that occurs prior to the dosing of the individual mold cavities. The monomer is substantially degassed to avoid the formation of gas bubbles in the dosed monomer, at either the time of dosing or the time of mold assembly, inasmuch as the bubble will induce cavitation or puddling of the monomer during polymerization thereby rendering the lens defective and unusable.

As illustrated in FIG. 6 the monomer or monomer mixture is provided in containers 100, typically 15 liters in volume. The container is connected to the monomer degassing system by means of line 112. Suction is developed by pump 114 to draw the monomer from the drum 100, through line 112, to pump 114, and out the pump discharge 116. While going through discharge line 116, the monomer passes through filter 118 in order to remove any extraneous particulate contaminants that may be present in the monomer.

The monomer is then provided to the inlet 120 of the degas unit 122. Within the degas unit, the monomer is divided among a plurality of tubes 124, and then recombined into a degas unit discharge 126. The degas unit is operated under a low ambient pressure, typically around 1–40 torr which is provided by vacuum pump 128. This vacuum pump is attached to the degas unit 122 by line 130 and discharges the excess air from the degas unit by way of line 132. The tubing members 124 are formed preferably of a gas permeable tubing such as STHT tubing produced by Sanitec, Inc. of Andover, N.J. from Q74780 Medical Grade Silicon Rubber manufactured by Dow Corning of Midland, Mich. While two tubes are illustrated in FIG. 6, it is understood that a plurality of tubes, typically 10 tubes are provided for the degas unit 122.

After the monomer exit the degas unit 122 by discharge line 126, it passes through an oxygen monitor 134. This monitor measures the residual oxygen within the monomer to insure that the degas unit is functioning properly. If the oxygen content of the monomer is indicated as being to high, operation of the production line can be halted until the problem is corrected in order to avoid the production of defective lenses.

Once oxygen monitor 134 has determined that the oxygen content of the monomer is sufficiently low, the monomer passes through line 136 into manifold 138. The manifold is used as a common source to supply a plurality of precision dose pumps 140 used to fill the individual contact lens mold at the monomer dosing station 50. The pumps 140 used to pump the processed monomer delivered to manifold 138 are IVEK pumps made by the IVEK Corporation of North Springfield, Vt. These pumps provide precision doses of degassed monomer to the mold cavities 31 via nozzles 142.

As was hereinafter previously described with respect to FIG. 1(a). The monomer is supplied from pumps 140 to nozzles 142 via supply lines 141 which may include coupling blocks 143 to aide in servicing the equipment. Each of the supply lines 141 is coupled to an associated discharge nozzle 142, two of which are illustrated in FIG. 5 which are suspended directly over the path of the pallet 30 and the individual front curves 31. The dosing station 50 includes a manifold block 51 for receiving each of the monomer discharge nozzles 142 and a vacuum seal 52 which may be used to cooperate with the outer perimeter 110(a) of pallet 30 to provide a sealed enclosure that may be evacuated with a vacuum pump so that the deposition of the monomer occurs in a vacuum. The manifold block assembly 51 reciprocates with respect to a fixed platform 52 on a pair of tubes or cylinders 53, 54 as will be hereinafter described with respect to FIG. 9. The dosing module 50 also includes a pair of bore scope tubes 55, 56 which enable inspection of the monomer dosing, if desired, through a fiber optic bore scope 200.

As illustrated in FIG. 9, the entire deposition module 50 is reciprocated vertically with respect to a fixed support frame 52 and 64 by means of a short stroke pneumatic cylinder 65 mounted on moveable frame 62 and to fixed frame 64 by drive rod 63a of pneumatic cylinder 63. Vacuum is supplied through the filling or dosing station through manifold 66 and vacuum line 67 to an interior manifold 68 formed in one of the two tubes 53,54. The tubes or cylinders 53,54 reciprocate with fixed guide tubes 57,58. A vacuum plenum is also formed in the manifold block 51 by means of bore holes 69 and 69(a) which provide vacuum communication between the vacuum manifold 66 and the interior of the dosing station 50 defined by perimeter seal 52 and the pallet 30.

An optic bore scope 200 is illustrated in FIG. 9 with an optic probe 201 extending down into the cavity defined by pallet 30 and manifold block 51. A dummy or blind 202 is installed in the other bore scope tube 56 to seal access into the interior vacuum plenum of the assembly station 50 when a bore scope is not in use.

In operation, a pallet 30 is advanced into the filling or dosing station 50 by means of the material handling ram 14 previously discussed with respect to FIG. 4. Once in position, the manifold assembly 51 is reciprocated downwardly by means of pneumatic cylinder 63. As the vacuum seal 52 on the manifold assembly 51 engages the pallet 30, the sensor assembly 65 may be triggered, thereby opening a valve to draw a vacuum in manifold 66, vacuum line 67, manifold 68 and plenum 69, 69(a). It should be noted that a vacuum is not required for filling or dosing of the mold cavities, but does avoid the possibility of $N^2$ gas being trapped between the monomer and the front curve mold half. It should also be noted that the ambient atmosphere surrounding pallet 30 is a low oxygen $N^2$ environment and evacuation of the chamber is an evacuation of the $N^2$ gas. After vacuum has been established within the dosing chamber, pumps 140 are actuated to deliver a controlled dose of 60 μl to each of the mold cavities 31 illustrated in FIG. 5.

Each of the nozzles 142 includes a teflon dosing tip with an O.D. of approximately 0.070" and on I.D. of approximately 0.040 I.D. Each tip is cut at approximately a 45° angle, and is positioned to be carried within 0.5 mm of the horizontal tangent of the front curve 31 at the time of dosing.

As the monomer or monomer mixture is dosed, it pools upwardly around the tip, as illustrated in FIG. 1(a), so that the angle of the tip is covered. When the manifold assembly 51 is reciprocated upwardly, the pool of monomer wicks the nozzle tip, and draws any excess monomer from the face of the tip to avoid drop formation on the tip. This wicking action increases the accuracy of the dose, it pulls off potential drops of monomer and it avoids any agitation of the monomer that might result in bubble formation.

If drops of monomer form on the tip, there is the possibility of contamination of a passing pallet or the dosing station from an inadvertent drop. Individual drops of monomer, even when deposited into a mold cavity, or on top of the monomer pool, have been found to generate a "seed" site for a gas bubble. By wicking the tip with the monomer pool, this possibility is substantially eliminated.

After the monomer has been dosed into the individual mold cavities, the vacuum is broken in manifold 66 and the manifold assembly 51 is reciprocated upwardly by pneumatic drive means 63 to allow transport of the pallet 30 to the apparatus 60 which coats the mold flange with a mold release surfactant. The filling module 50 can be raised to a high service position by means of pneumatic cylinder 63.

The First Mold Assembly Apparatus

The operation of the assembly station of the present invention will be explained with reference to two embodiments, the first being illustrated in FIGS. 8 and 10–13, and the second being illustrated in FIGS. 15 and 18–19.

Figure 8A:
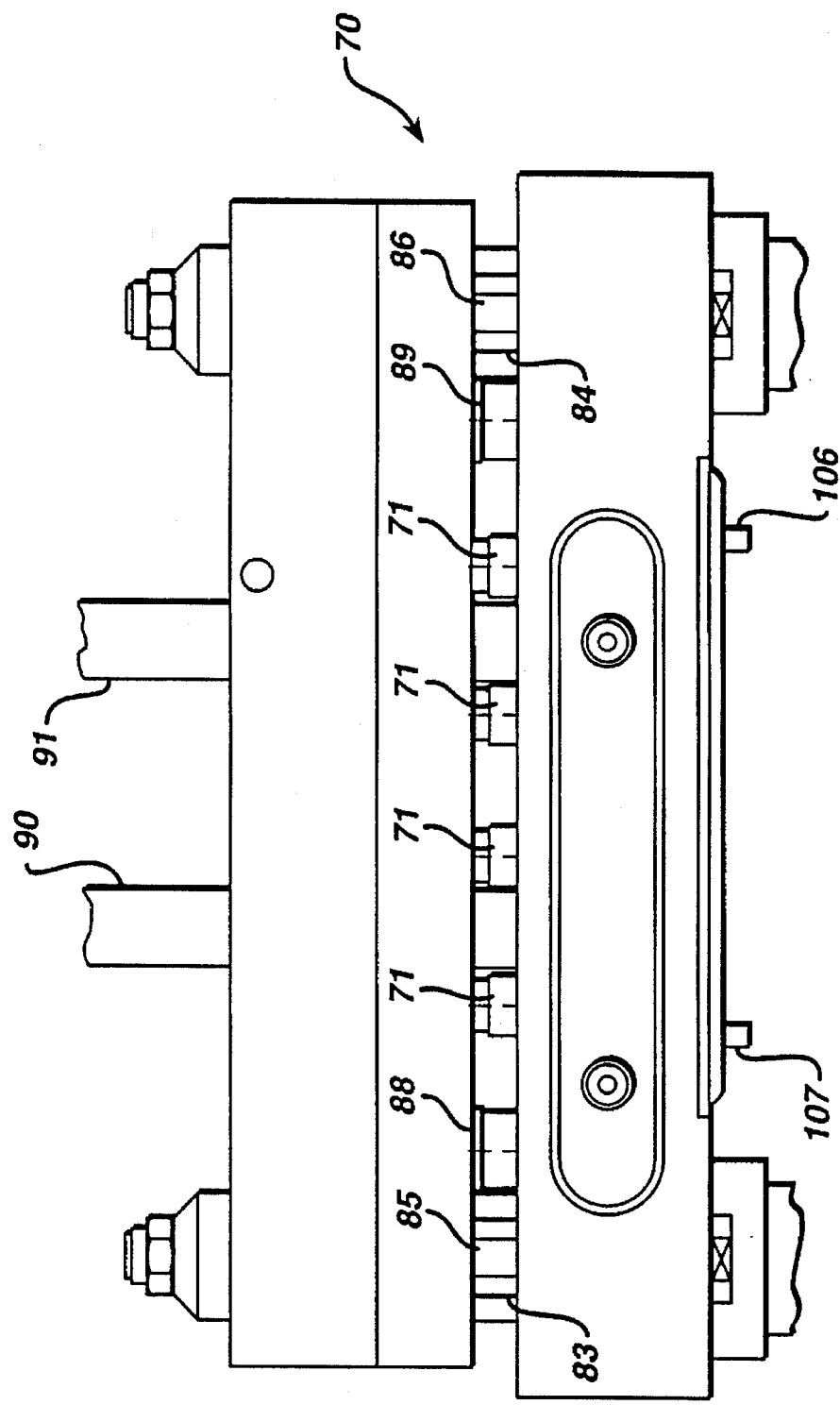
FIG. 8(a) is a diagrammatic side view of the exterior of the assembly module of one embodiment of the present invention.
Figure 8B:
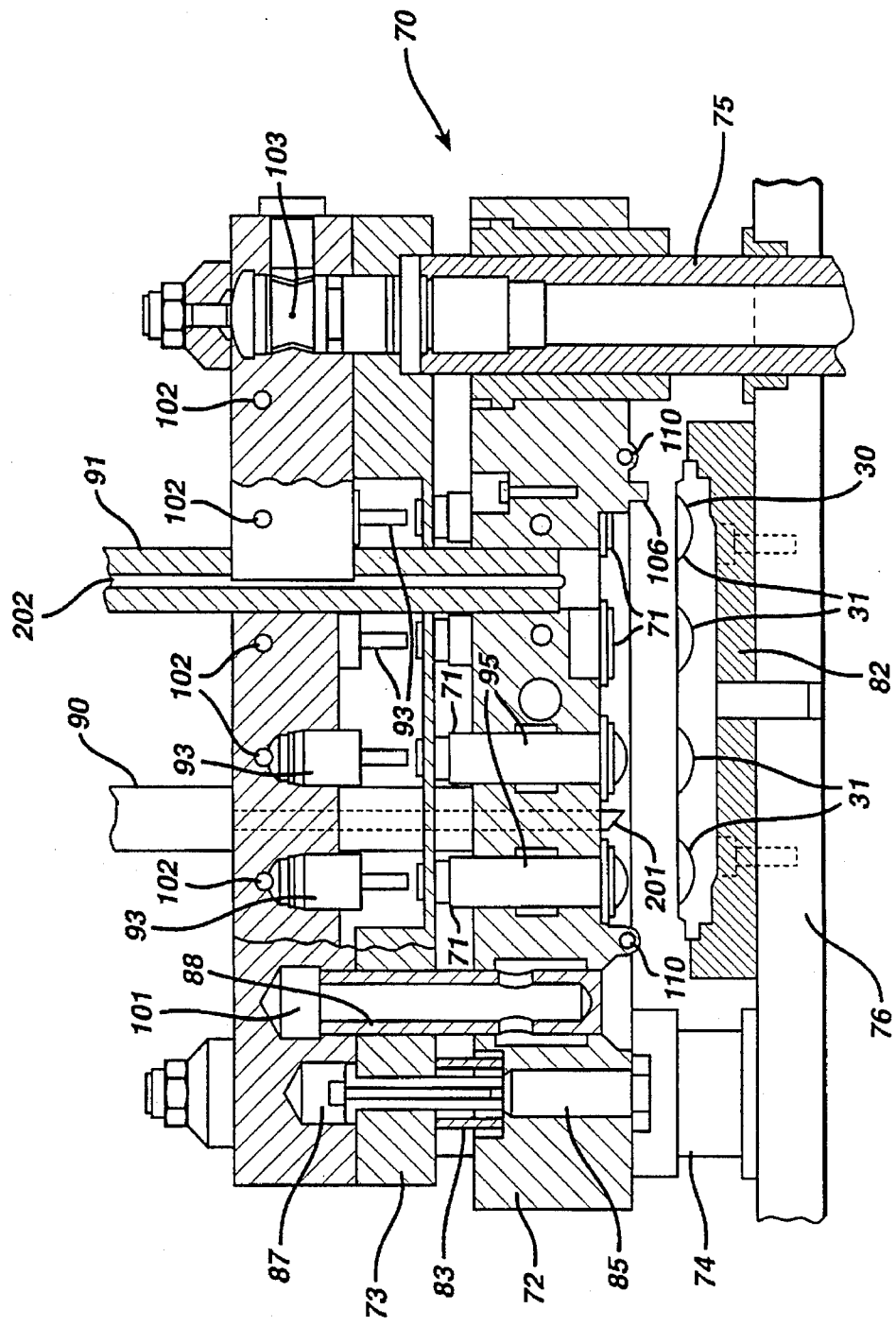
FIG. 8(b) is a partially cross-sectioned side view of the assembly module illustrated in FIG. 8(a).

With respect to the first embodiment, FIG. 8(a) represents an external elevation view of the assembly module 70 and FIG. 8(b) represents a partially cross-sectioned view of the first embodiment of the assembly module 70 that is sectioned along two separate axes from section line A–A' for the purposes of illustration. This assembly station 70 includes 4 reciprocal pistons 71, two of which are illustrated in the left section of a-a' of FIG. 8(b) with back curves attached thereto and two of which are partially visible in the right hand section of a-a' of FIG. 8(b) without back curves. It should be understood that in the preferred version of this embodiment 8 reciprocating pistons are used for pallets having 8 sets of front and back curve mold halves. The reciprocating pistons 71 are mounted for reciprocation within the vacuum housing 72 and are both carried by and may float within the primary housing 73. Each of the three members 71, 72 and 73 reciprocate at various times, both with respect to each other and with respect to the pallet 30 and the pallet front mold curves 31.

Figure 10:
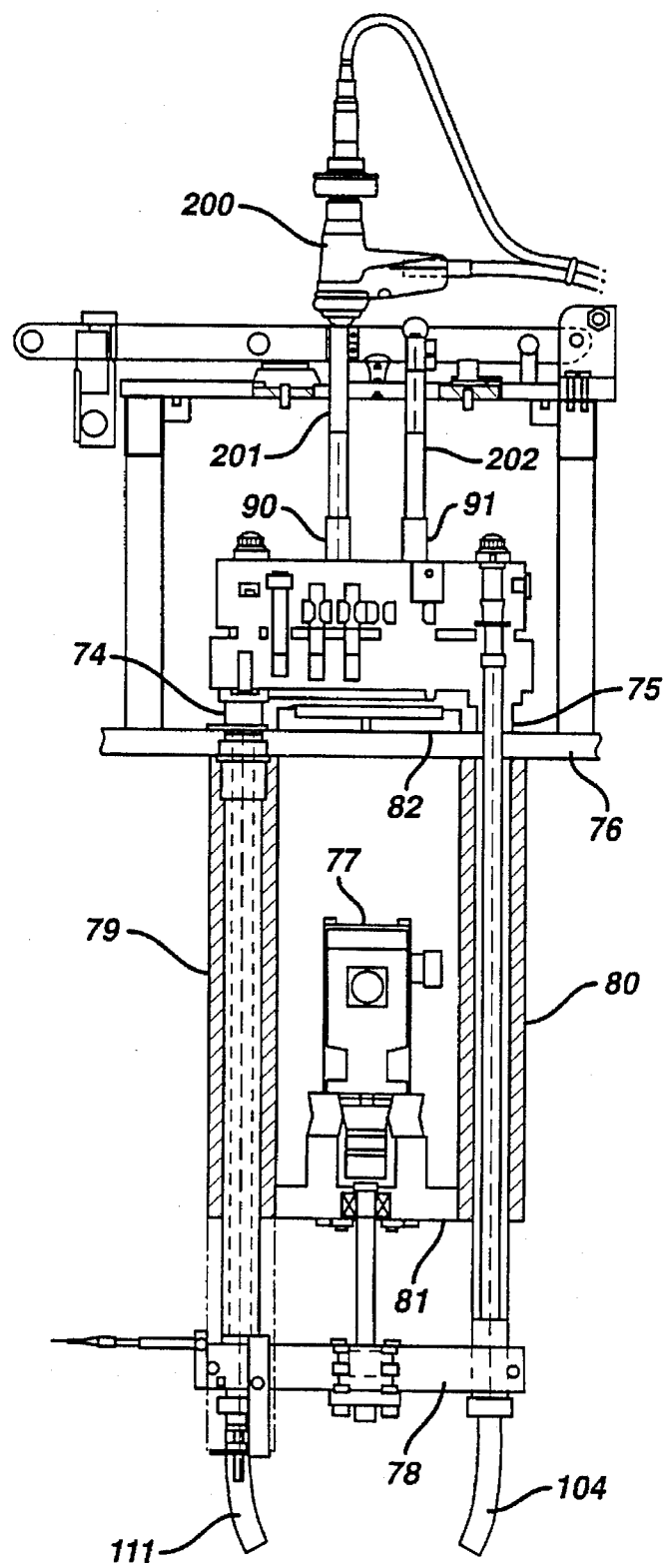
FIG. 10 is a diagrammatic and partially cross-sectioned illustration of the assembly station of one embodiment of the present invention illustrating the vacuum supplies for the reciprocating assembly station.

With reference to FIGS. 8(b) and 10 and the first embodiment shown therein, the vacuum manifold housing 72 and the primary housing 73 are mounted for reciprocal movement on cylindrical shafts or tubes 74,75 and reciprocate with respect to stationary frame member 76 in response to a servo motor 77 which raises and lowers a reciprocating support platform 78. Drive motor 77 is fixably attached to frame member 76 by means of guide tubes 79 and 80 and cross-member 81. Thus, the stationary frame member 76, guide tubes 79,80 and cross-member 81 provide a box frame that is stationary with respect to the reciprocating members of the apparatus. The pallet guide rails 82 are also fixed with respect to the stationary fixed platform 76. As indicated previously, the pallet 30 is advanced through the pallet guide rails 82 by means of the material handling pusher 14 previously described and illustrated with respect to FIG. 4.

As illustrated in FIG. 8(b), also with respect to the first embodiment of this invention as shown therein, the vacuum manifold housing 72 and the primary housing 73 reciprocate with respect to each other with the vacuum manifold housing 72 being biased downwardly by a pair of spring members 83,84 positioned on opposite sides of the respective housings. The vacuum manifold housing 72 is secured to the primary housing 73 by virtue of a pair of bolts 85,86, one of which is illustrated in cross-section in FIG. 8(b) as 85, which are free to reciprocate upwardly into a recesses such as recess 87 formed in the primary housing. Likewise, the reciprocating pistons 71 and reciprocating manifold members 88,89 also provide reciprocating guides and support between the two housing members 72,73.

A pair of bore scope housings 90 and 91 provide access for a bore scope 200 and a fiber optic probe 201 which may be inserted into the assembly cavity for viewing or quality control purposes. When not in use, the bore hole housings 90,91 are closed by a blind 202 in order to allow a vacuum to be drawn within the assembly housing.

Figure 11:
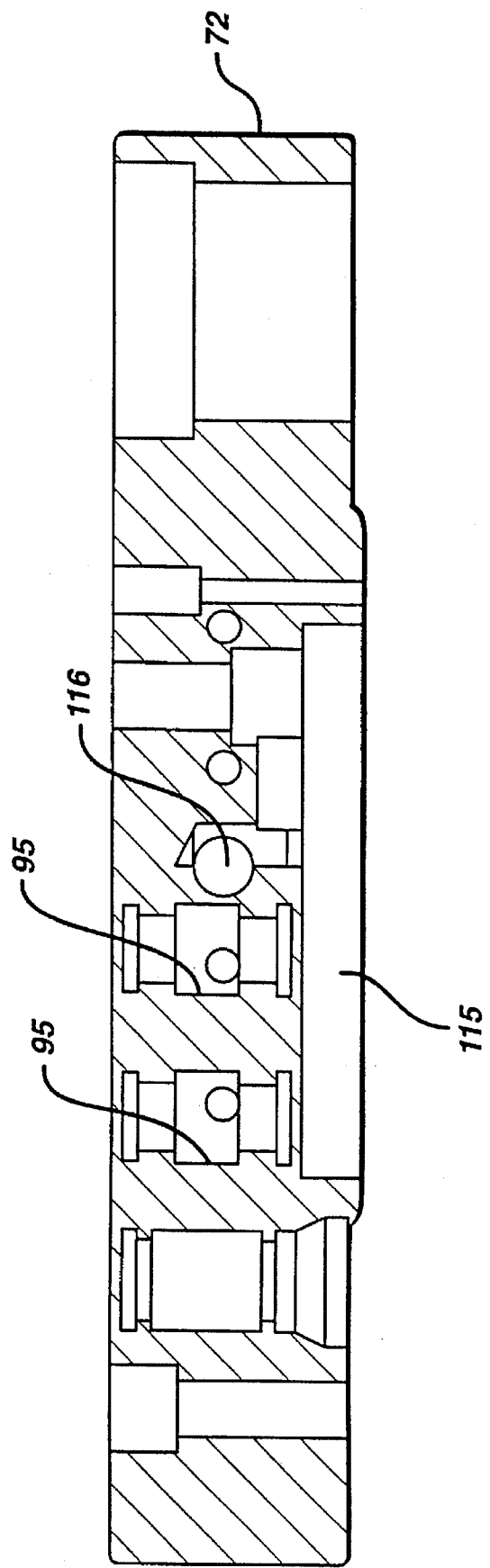
FIG. 11 is a cross-sectional view of the vacuum manifold used in the reciprocating module of the assembly station illustrated in FIG. 10.

In operation, a pallet 30 containing mold half back curves is advanced under the reciprocating pistons 71 as was previously described with respect to FIG. 1(c). When the pallet is in position, the assembly module 70 is reciprocated downwardly by pneumatic drive motor 77 and cross-member 78 and the reciprocating tubes 74,75 to draw both the vacuum manifold housing and the primary housing downwardly. The vacuum manifold housing 72 is biased in its downward position by means of springs 83,84 and the individual reciprocating pistons 71 are biased downwardly by virtue of their mounting within the vacuum manifold housing 72, and by virtue of air pressure maintained within the pneumatic cylinders 93 mounted in the upper portion of primary housing 73. Pneumatic cylinder 73 are pressurized by plenum cavity 102 which connects each of the cylinders 92 to a common air pressure service. Within approximately 0.25 seconds, the reciprocating pistons 71 have engaged the back curve mold halves on pallet 30 and a vacuum is drawn through vacuum manifold 71(a) in reciprocating piston 71, which has radial bores 94 which communicate with an annular chamber 95 formed in the vacuum manifold housing 72, two of which are illustrated in FIGS. 8(b) and 11. Each of these annular chamber passageways 95 is interconnected to each other and a common plenum 97 that extends across all 4 annular manifolds 95 on one side of the vacuum manifold housing 72.

A pair of reciprocating vacuum manifolds 88,89 connect the vacuum manifold 72 with the primary manifold 73, with one of the tubes 88, illustrated in cross-section in FIG. 8(b). The vacuum manifold 88 reciprocates in bore 98, while vacuum manifold 89 reciprocates in bore 99. These reciprocating manifolds are essentially identical, except that they supply vacuum at two different pressures to two different parts of the assembly module.

Figure 13:
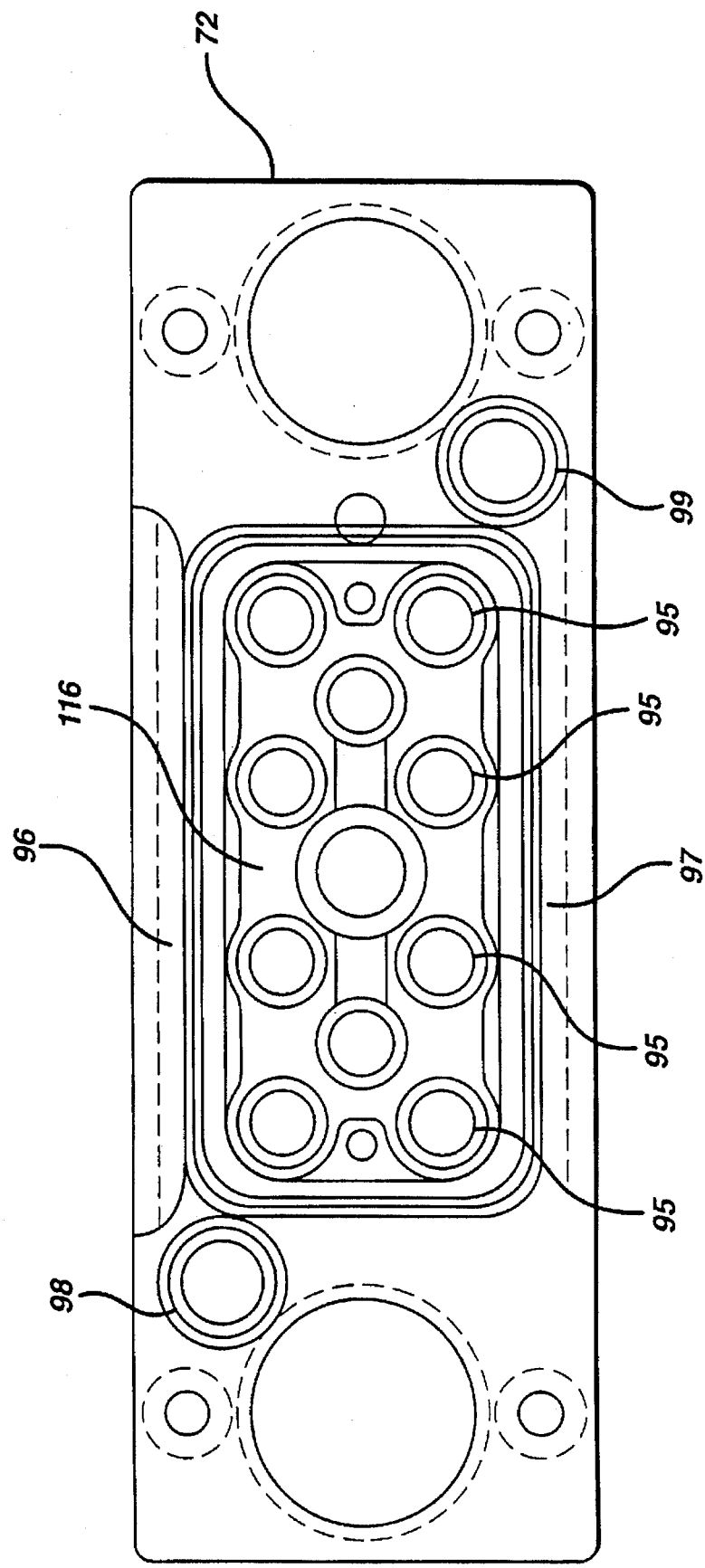
FIG. 13 is a plan view of the vacuum manifold illustrated in FIG. 11.

As illustrated in FIGS. 13 and 8(b), the longitudinal plenum 97 terminates in annular chamber 99 which in turn communicate with a reciprocating vacuum manifold 89 and an upper plenum cavity 102. Plenum 102 is connected to the upper portion of vacuum assembly 103 which in turn communicates with the reciprocating cylinder or tube 75. The vacuum maintained in reciprocating tube 75 is in turn drawn by vacuum line 104 through a shut-off valve and manifold (not shown). Thus, vacuum drawn through vacuum tube 104 pulls the $N_2$ present in the low oxygen environment through the reciprocating pistons 71 into common plenums 95,97 in the vacuum manifold housing, upwardly through reciprocating manifold 89 into the primary housing, and then downwardly through the reciprocating tubes 75 for exhaust.

Figure 2:
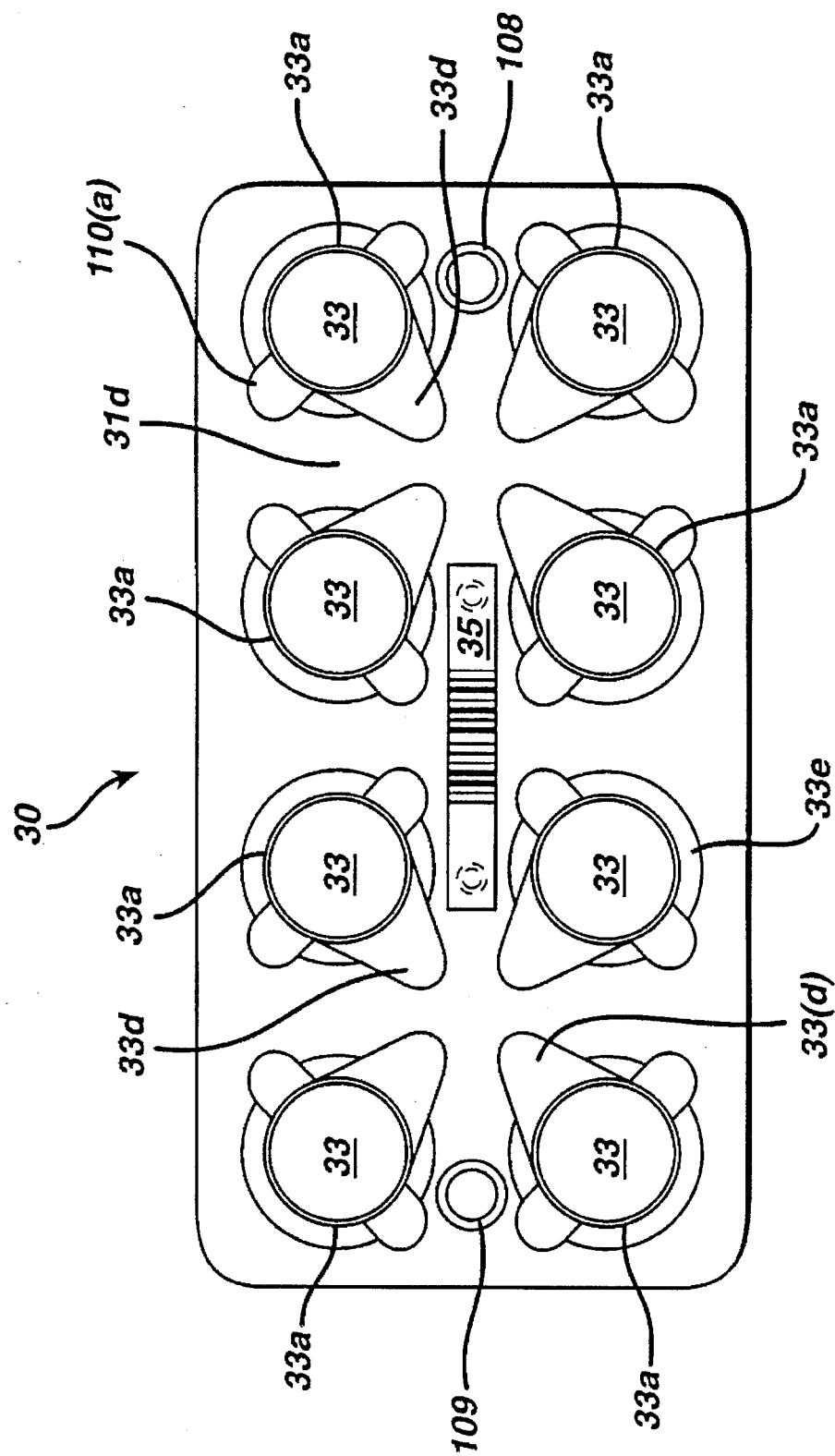
FIG. 2 is a plan view of a carrier used to transport a plurality of contact lens molds to and from the filling and assembly station.

As the assembly module of this first embodiment reaches its lower most point of travel, each of the back curves is removed from the back curve mold pallet 30 by the vacuum drawn in the reciprocating pistons 71. The entire assembly module 70 is then reciprocated upwards in approximately 0.25 seconds to enable transport of the empty pallet 30 out of the assembly module and the insertion of a new pallet 30(b) that is filled with front curve mold halves, each one of which has been dosed with a monomer at the filling module 50. Pallet 30(b) is advanced into position as previously described with respect to FIG. 4, but is registered in precise position by means of tapered registration pins 106,107 which cooperate with the blind registration holes 108,109 formed on pallet 30, as illustrated in FIG. 2. The tapper on pin 106 is sufficient to register the pallet within ±0.1 mm for the purposes of precision assembly of the mold halves.

The assembly cycle begins by reciprocating both the vacuum manifold housing 72 and the primary housing 73 downwardly until a perimeter seal 110 contacts the outer perimeter 110(a) of the pallet 30. As contact is made with the perimeter seal, a vacuum switch is actuated by means of a proximity switch adjacent to reciprocating cross-head 78 which actuates a second vacuum source which is drawn through vacuum tube 111 and the interior of reciprocating drive tube 74 to evacuate the chamber formed between the vacuum manifold housing 72 and the platform 30. The vacuum is drawn, as illustrated in FIGS. 8(b), 11 and 13 through the center of the vacuum manifold housing 72 by virtue of a common plenum 115 which empties into a center bore hole 116 which is in turn connected to longitudinal manifold 96 and the annular chamber 98 and through the vacuum manifold tube 88 to the upper primary housing manifold 101, and from this passageway via a connecting manifold to the interior of reciprocating drive tube 74 in a manner similar to that previously described and illustrated with respect to manifold 102 and the interior of drive tube 75.

It should be noted that the vacuum drawn in the two reciprocating drive tubes 74,75 is slightly different, with the vacuum drawn in the tube 75 being slightly greater than that drawn in tube 74 in order to insure that the back curves are retained on the reciprocating pistons 71 prior to their deposition on the monomer and the front curve mold half. In the preferred embodiment, the pressure drawn in the vacuum manifold around the pallet 30 is on the range of 5 to 7 millibars while the vacuum drawn within the reciprocating pistons 71 is on the order of 3 to 5 millibars.

Permitting the reciprocating action of the pistons 71 through the vacuum manifold housing 72 into the drawn vacuum, and maintaining the vacuum throughout any translation, requires a sealing means between the shafts of the pistons 71 and the vacuum manifold housing ports through which they reciprocate. The importance of the differential between the vacuum levels being drawn within the pistons and the vacuum of the main chamber increase the criticality, as well as the complexity, of this requirement. An additional practical requirement for such a sealing means is that it be compatible, or at least adjustable, with respect to manufacturing variances in piston 71 and O-ring morphology.

Figure 12:
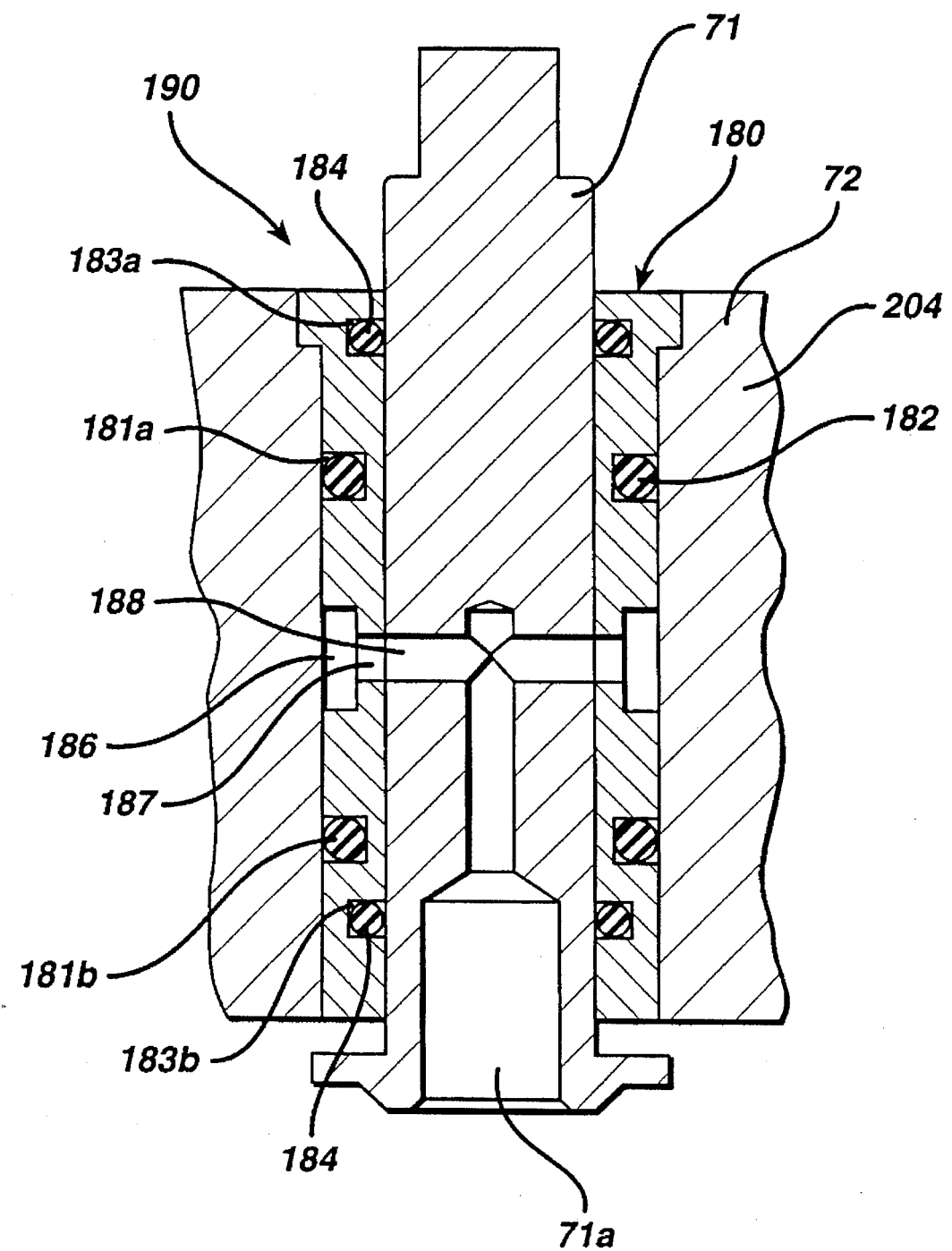
FIG. 12 is a cross-sectional view of the vacuum tube and sleeve assembly of the assembly station illustrated in FIG. 10.

The vacuum tube sleeve assembly shown in FIG. 12 illustrates a design solution which meets the above cited complexities with respect to translating the piston shafts through the vacuum manifold. While a single sleeve assembly is illustrated in FIG. 12, it is understood that the typical manifold may contain a plurality of sleeves and pistons as illustrated in FIGS. 5 and 8-11.

An individual vacuum tube sleeve assembly according to the specific requirements of either embodiment of the mold assembly apparatus includes a cylindrical sleeve element 180 having an outer diameter generally equivalent to an inner diameter of an opening 190 which extends through the vacuum manifold housing 204. The inner diameter of the vacuum tube sleeve 180 is generally equivalent to the outer diameter of the piston shaft 71.

The piston 71, which is an elongate element has a plenum 71a formed in the open end thereof. The piston 71 also has a pair of radial bores 188 which connect the exterior lateral surface of the piston 71 to the plenum 71a. The sleeve 180 has two lateral orifices 187 which are transverse to the longitudinal axis of the sleeve 180 and which connect to the radial bores 188 of the piston 71. The lateral orifices 187 of the sleeve 180 is connected to an annular passageway 186 formed in the outer surface of the sleeve. This annular passageway 186 permits the lateral passageways 187 to remain connected to an external vacuum (as described below) independent of rotational orientation.

The vacuum manifold 204, in conjunction with which the pallet 30 forms a housing member in which a chamber vacuum is drawn, also includes a plurality of annular chamber passageways (not shown) which have open ends at the inner surface of the opening 190 through the housing which the sleeve 180 is fitted to. The other ends of the annular chamber passageways are coupled to an external vacuum (also not shown). It is through the annular chamber passageways, the lateral orifices 187 of the sleeve coupling 180, and the radial bores 188 of the piston that a vacuum may be drawn in the piston plenum 71a and the piston can grip the curve halves (as seen in FIG. 1(d)).

The outer surface of the vacuum sleeve 180 also includes two circumferential O-ring grooves 181a,181b. One of these grooves 181a is located at a position between the exterior (first) connection of the lateral orifices 187 to the annular chamber passageways of the manifold and the exterior of the chamber manifold; the other groove 181b is disposed between the first connection and the interior of the vacuum chamber. In each circumferential groove, standard O-rings 182 are fitted to prevent leakage into or out of the corresponding vacuums (the piston vacuum or the chamber vacuum).

The inner diameter of the vacuum sleeve has two similar circumferential grooves 183a,183b in which O-rings 184 are fitted. The grooves 183a,183b are spaced above and below the interior (second) connection of the lateral orifices 187 to the radial bores of the piston, for the similar purpose of preventing leakage from or into the differential vacuums.

During operation of the assembly, piston 71 slides through the sleeve 180 while O-rings 184 maintain a vacuum seal. Because of their dynamic operation, O-rings 183, unlike standard O-rings 182, are selected specifically for the piston which reciprocates in that sleeve. The variances of the manufacturing dimensional tolerances of each piston 71 is thereby specifically addressed by the selected O-rings 183. This sleeve significantly increases the interoperability of each piston 71 with respect to vacuum manifold housing 204, by circumventing the need to individually match the pistons to the openings in the housing member through which it reciprocates.

After the vacuum has been established in the vacuum manifold housing 72, the vacuum manifold housing ceases to reciprocate and remains stationary with respect to the pallet 30. However, the upper or primary housing 73 continues to reciprocate downwardly along with the pistons attached thereto, enabling the back curves to contact the monomer and slowly displace it outwardly to fill the mold cavity as the two mold halves are assembled. The vacuum maintained around the housing enables the assembly of the two curves in a more rapid and expeditious manner than if assembled under ambient $N^2$ pressure. When assembled under vacuum, the deposition speed may reach as high as 5 mm per second, whereas without vacuum, any speed greater than 0.2–1 mm per second may result in undue agitation of the monomer and the creation of bubbles which effect and impair the quality of the resultant lens. Thus, the assembly rate which took 6 to 9 seconds under atmospheric conditions can now be accomplished in 1 to 2 seconds. Further, if a vacuum is not drawn, it is possible for nitrogen to be trapped between the mold halves or between the monomer and the back curve thereby creating another bubble or puddle which will result in rejection of that lens.

Independent travel of the two manifolds 72,73 in this embodiment is provided since the vacuum manifold housing 72 no longer reciprocates downwardly after it is seated on pallet 30. As illustrated, the apparatus of FIGS. 8 and 9 provide an optional clamping motion, wherein the upper primary housing continues to reciprocate downwardly depositing the back curve mold half, and continuing on to the Z overtravel point illustrated in FIG. 7, thereby compressing springs 83 and 86. As these spring members are compressed, the reciprocating pistons 71 float between the back curve mold halves 33 and pneumatic cylinders 93 mounted for reciprocation in manifold 73, which have been pressurized to a predetermined pressure. Thus, a clamping pressure is generated on the back curve mold member, as determined by the air pressure maintained in pneumatic cylinders 93, and not by spring members 83,84, or the pressure generated by drive motor 71. This enables independent reciprocal movement or floating movement of each of the reciprocal pistons 71, while enabling all of the pistons to be pressurized to a common predetermined value. Thus, misalignment of a single mold part will not destroy the entire batch of mold assemblies on pallet 30.

As was described earlier with respect to FIG. 1, the optional clamping pressure seats the back curve mold half on the front curve mold half and seats the convex portion of the curve against the parting ring 31(c) formed on the front curve mold half thereby severing the monomer in the lens blank 32 from the monomer in the excess HEMA ring 34. Also, as indicated in FIG. 7, after the mold halves have been seated, the vacuum in each of the reciprocating pistons 71 is first broken by opening a valve in vacuum line in 104. Shortly thereafter, and after a predetermined clamping period and a predetermined clamping pressure, the vacuum between the vacuum manifold housing and the pallet 30 is broken by opening a valve in vacuum line 111. Typically the period is 0.5 to 3 seconds, but preferably is 1.5 seconds. The clamping pressure may range from 0.5 to 2 Kgm/lens but preferably is 1 Kgm/lens. Thereafter, drive motor 77 is actuated and the entire assembly module 70 is raised upwardly and reset for a new back curve pickup and a new cycle of operation. In the event the optional clamping movement is not provided, the resilient biased pistons 71 are fixably mounted in vacuum manifold 72 and reciprocates downwardly to seat the back curve well into the monomer, but 0.1–0.2 mm from sealing engagement with the parting ring 31(c). In this variation of the first embodiment, the optional clamping step may also be provided in the precure step. When seated in this monomer, vacuum conditions, atmospheric pressure will "clamp" the mold halves together when the vacuum in the vacuum manifold 72 is broken.

The Second Mold Assembly Apparatus

A second alternative embodiment of the assembly module will now be described with references to FIGS. 15–19. This embodiment has many similar features to the first embodiment, while also including several advances and improvements which shall become evident through the description and drawings set forth herein. This description shall include a step by step description of the alternate functioning according to the time chart of FIG. 14, described above.

Figure 15:
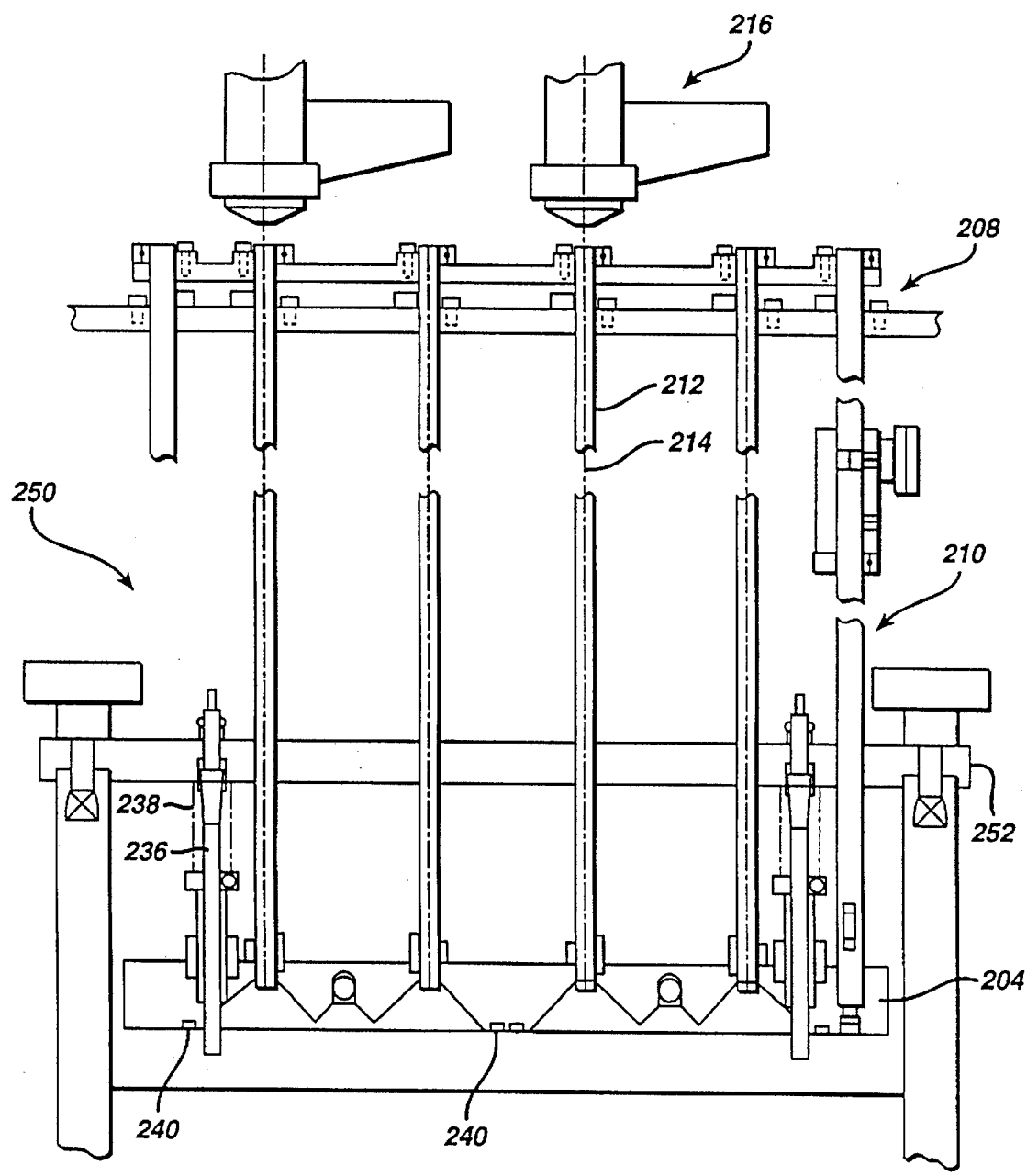
FIG. 15 is a partially cross-sectioned side view of the exterior of the assembly module of the highly preferred embodiment of the present invention.
Figure 16:
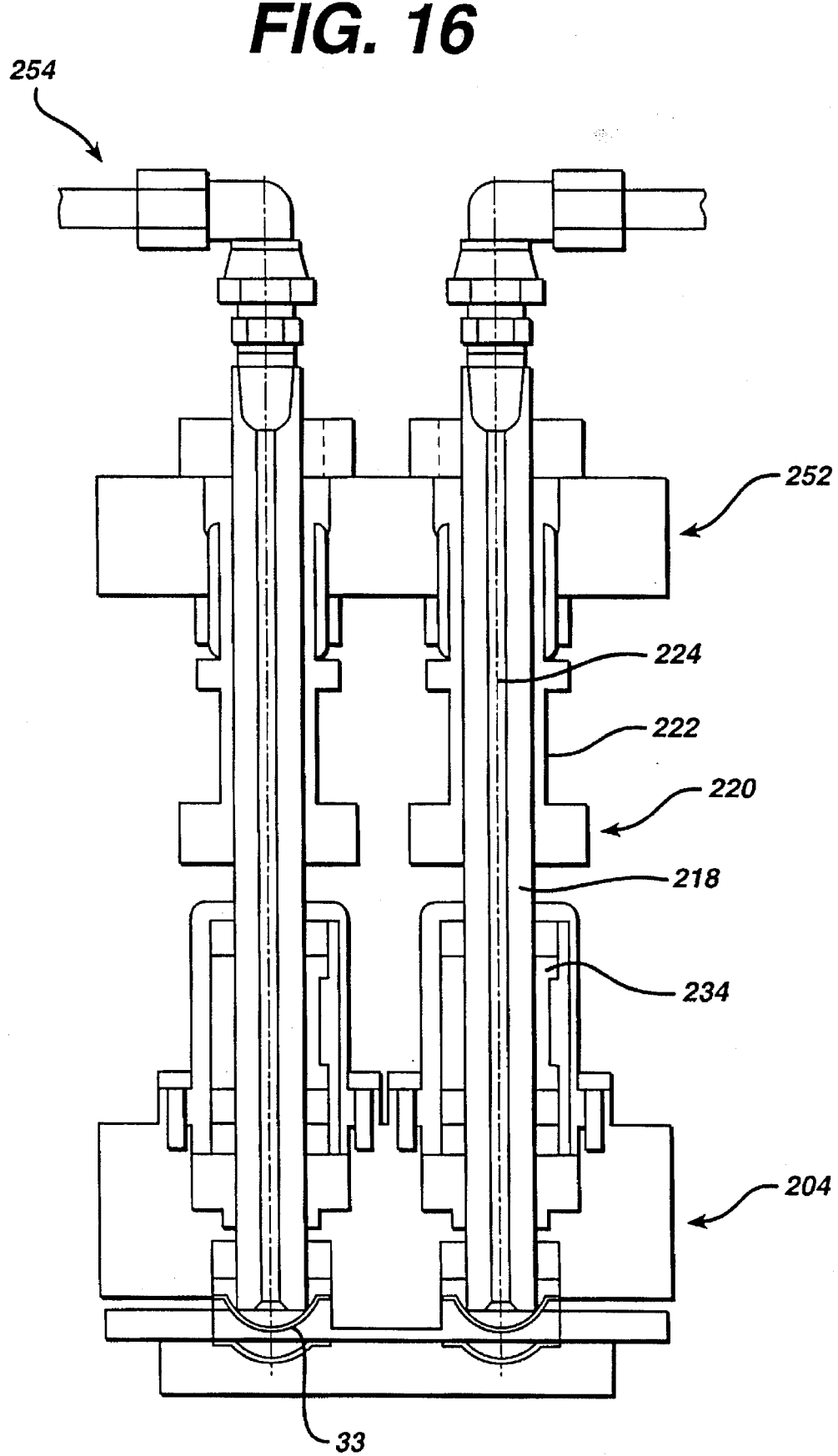
FIG. 16 is a cross-sectional view of the reciprocating pistons mounted within the primary and vacuum housing as well as the vacuum head assemblies attached thereto.
Figure 17:
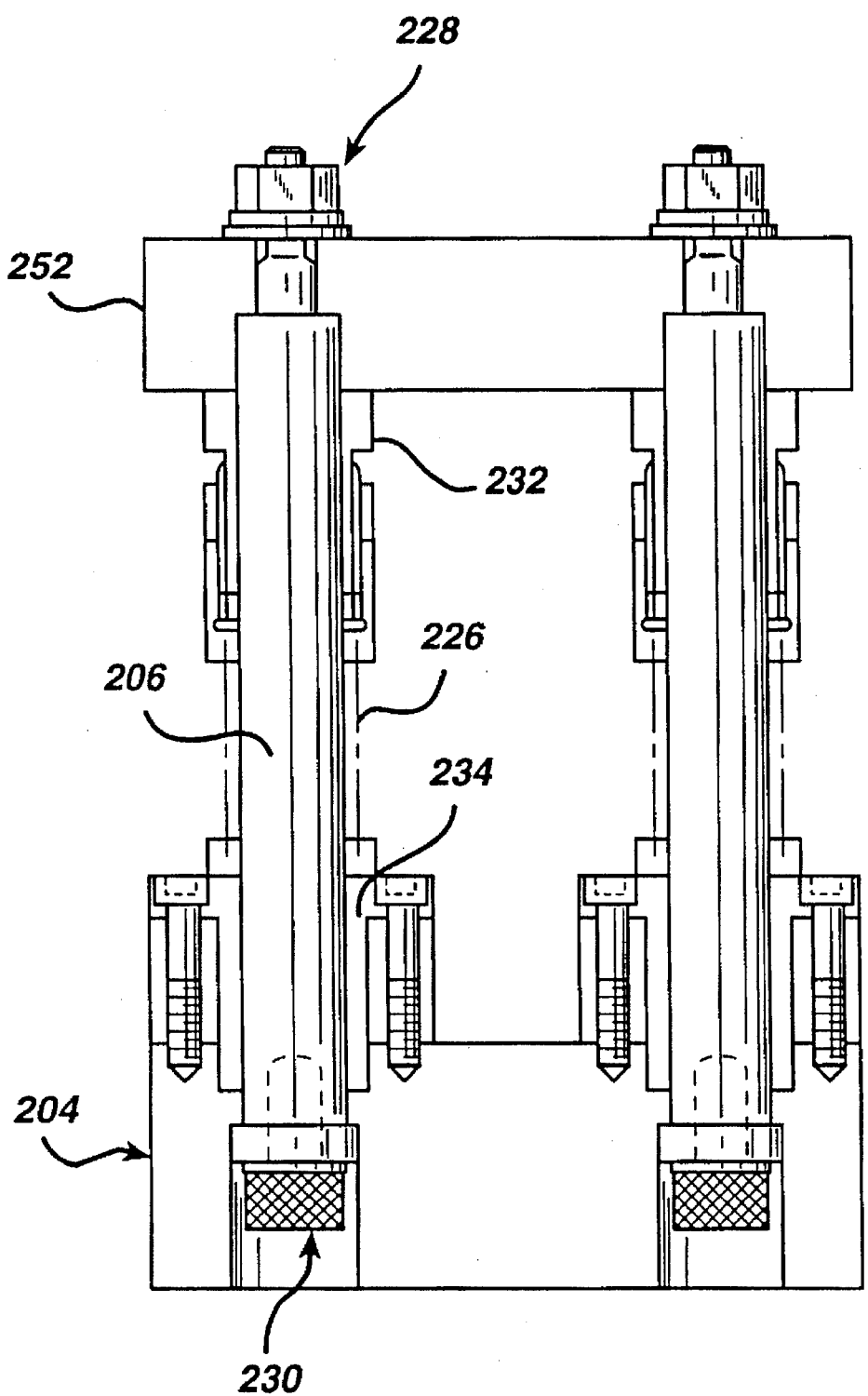
FIG. 17 is a cross sectional view of the overstroke spring biased bolts which secure the vacuum housing to the primary housing and which are capable of reciprocating within the vacuum housing.
Figure 18:
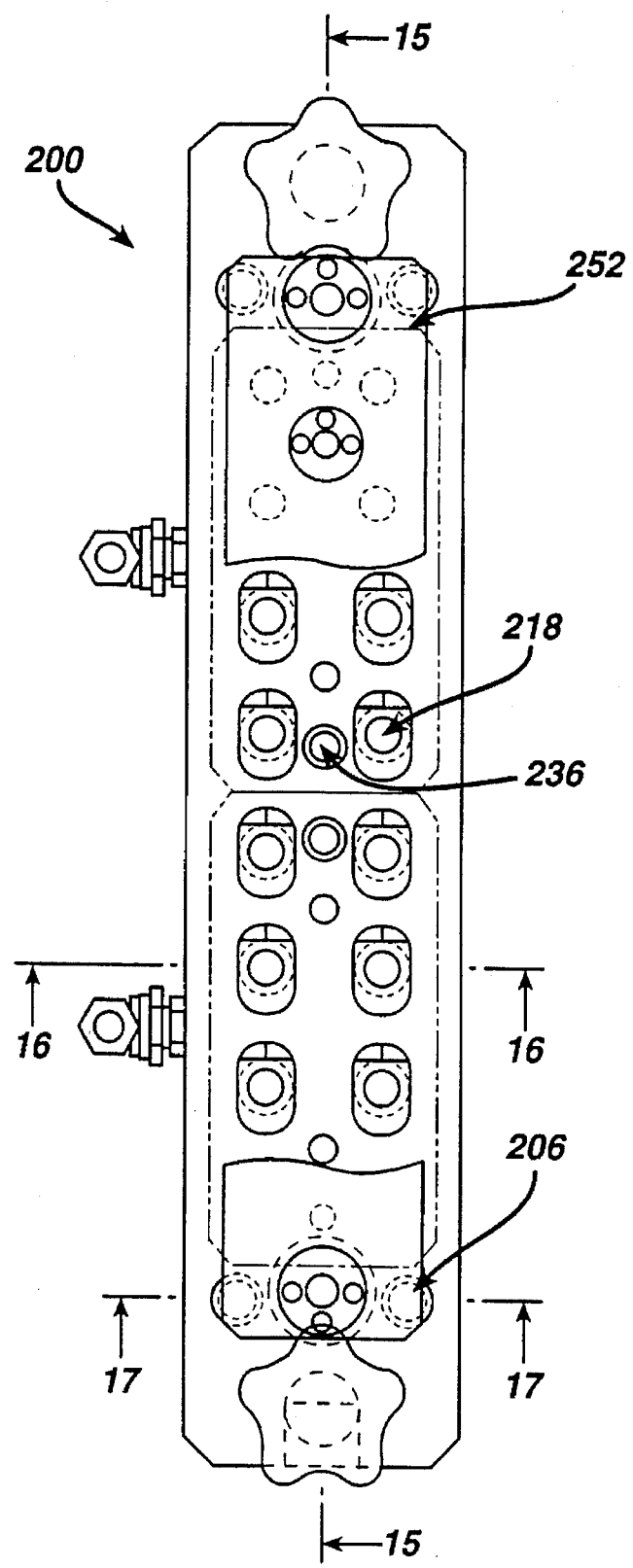
FIG. 18 is a top view of the assembly station, therein illustrating the cross sectional lines which correspond to the views shown in FIGS. 15–17.

Referring now to FIG. 18, a top view of the assembly station 200 is shown including lines of cross section corresponding to the sections illustrated in FIGS. 15–17. Line A—A corresponds to the cross section which is FIG. 15. Line B—B corresponds to the cross section which is FIG. 16. Line C—C corresponds to the cross section which is FIG. 17.

Referring to FIGS. 15 and 17, the assembly module 250 is shown in a cross sectional view. The assembly station 250 includes a primary support beam 252 which is rigidly coupled to a support platform, similar to the support platform 78 (not shown) as was described with respect to FIG. 10. The support platform and the primary support beam 202 are together reciprocated up and down by a driver means, such as a response servo motor similar to the motor 77 illustrated in FIG. 10. It is understood that the specific response servo motor may utilize a variety of different principles, each being well known in the art, e.g., ball screw driver means, a hydraulic means, an air pressure means, or a magnetic driver means.

A vacuum chamber manifold 204 is coupled to the primary support beam 252 by manifold support shafts 206. The manifold support shafts 206 are shown in FIG. 17, which is a cross sectional view of the preferred embodiment. At one end, the manifold support shafts 206 are rigidly coupled to the primary support beam 252 with threaded nuts 228 above the beam 252 and a rigid placement collar 232, affixed to the shaft 206, below. At their other ends the manifold support shafts 206 extend through the manifold 204 such that they may slide through it if the manifold is stopped and the primary housing continues to descend. The sliding ends are fitted with end cap nuts 230 which prevent the shafts 206 from being retracted from the manifold 204 during subsequent upward motion. Vacuum seals 234 are attached to the top of the manifold 204 at the entrances of the shafts 206 which seals 234 enable the system to hold a vacuum beneath the manifold 204 as the shafts 206 reciprocates within the manifold.

A spring 226 couples the shaft 206 to the vacuum manifold 204 so that a constant biasing force is applied against the vacuum manifold, pushing it along the shafts 206 toward the end cap nuts 230. If the manifold is stopped, such as when it seats against the top of the pallet 30 (not shown), and the primary support beam continues to descend, the springs 226 are compressed. This compression provides an additional sealing force to seat O-rings 240 against the pallet 30 whereby a sealing interface between the manifold and the pallet may be maintained. As the primary support beam continues to descend, the shafts 206 begin to slide through the manifold 204 therein permitting continued descent with only the spring force opposing its motion.

As illustrated in FIG. 15, the mold assembly station includes registration pins 236 which are inserted into registration holes of the pallet (not shown) to align the system. Once the pallet is positioned in the assembly station, and generally aligned with the registration pins, the operations of the remainder of the assembly may carried out accurately with minimized susceptibility to misfeeding of the pallet. The registration pins 236 are slideably mounted through the manifold 204 and coupled at their top or external ends to the primary support housing 252 via biasing springs 238. Attached to the top of the manifold 204, at the point where the registration pins 236 pass through the manifold 204 are vacuum seals 235 to the pins 236 to slide with respect to the manifold without compromising the vacuum in the chamber. The lower or internal ends of the registration pins 236 are beveled for easy alignment with the registration holes of the pallet. The beveling of both the registration pins and the holes enables the downward traveling registration pins to align the pallet with respect to small variations in the pallet feed accuracy. The biasing springs and the slidable mounting of the pins allows the assembly to avoid becoming jammed in the event that the pallet is misfed. In such an event, the registration pins slide upward when they contact the pallet if they are not aligned properly with respect to the holes.

Referring again to FIG. 15, an optical platform 208 is fixably mounted to the vacuum chamber manifold 204 from above by rigid optical platform supports 210. Extending down from the optical platform 208 are bore scope housings 212, which contain fiber optic probes 214 that penetrate into through the vacuum manifold 204. Bore scopes 216 may be used, in conjunction with the fiber optic probes 214 to view the assembly process, such as for quality control purposes. In order to maintain a vacuum in the chamber, it is understood that the bore scope housings are sealed to hold a vacuum as well.

Referring now also to FIG. 16, a representative pair of pistons 218a, 218b, respectively, are shown in accordance with the second embodiment of the present invention. It is understood that while the view shown in FIG. 16 illustrates only two pistons, the number of pistons included in the present embodiment is 16 (as shown in FIG. 18), and that the number of pistons may vary with the specific embodiment the station assembly.

An annular ring support collar 220 is fixably attached to each of the pistons 218a,218b, which support collar 220 is coupled to the primary support beam 252 by a biasing spring 222. The top portion of the piston shaft 218a or 218b extends through the primary support beam 252 and remains in slidable relationship therewith. The precise position of the piston relative to the primary support beam 252 being determined by the spring constant and the force applied to the spring via the piston. The bottom portion of the piston extends into the vacuum manifold 204. The piston, however, is sealingly engaged at the manifold by a vacuum seal 235 to prevent leakage of the vacuum within the vacuum chamber as the piston reciprocates. The vacuum pressure within the chamber in the present embodiment is drawn within the range of 5 to 7 millibars while the range of pressures within the pistons is drawn to within 3 to 5 millibars. The vacuum seal 235 does not otherwise inhibit the free sliding of the piston with respect to the manifold.

The each of the pistons 218a,218b includes openings at either end and an internal bore 224 which extends the entire length of the shaft. A vacuum connection hose 254 is fixed to the top portion of each piston 218a,218b which extends above the primary support beam 252. Via the connection hose 254 and the internal bore 224, an external vacuum (not shown) provides the suction to grip the back curve mold half 33.

The operation of the second embodiment of the mold assembly station 250 of this invention, as briefly described with respect to the timing diagram of FIG. 14 is herein disclosed more fully with respect to the above identified structural elements. At the start of each cyle a pallet 30 containing individual back curve mold halves 33 is conveyed to a position beneath the mold assembly station 250. Once the pallet has been positioned, the primary support beam 252 and the vacuum manifold housing 204 coupled to it are driven by the response servo motor downwardly toward the pallet. The registration pins 236 of the manifold penetrate into the alignment holes of the pallet, and as the manifold continues to descend, the O-rings 240 make contact with the surface of the pallet.

After an initial seating of the O-rings seat, the manifold support shafts 206 begin to slide downward through the manifold 204. This relative motion causes a compression of the biasing springs 226 which supply a constant compression force to the manifold which seats the O-ring 240 on the pallet.

The pistons 218a,218b, which are slideably coupled to the manifold 204 begin to slide deeper into the manifold as the primary housing 252 continues downward. This translation continues until the tips of the pistons touch the back curve mold halves 33 on the pallet, and seat against them. Variations in the thicknesses and seating of the individual back curves means that the pistons do not necessarily come in contact with their respective back curves simultaneously. For this reason, an overstroke in the translation of the the primary support beam 252 is designed into the system, whereby the beam 252 travels farther down than is necessary to cause the pistons 218a,218b to contact the back curves. The overstroke could easily damage the back curves or the tips of the pistons but for the slidable mounting of the pistons to the primary support beam. By slideably mounting each piston, and providing each with an individual biasing spring 222, once a force sufficient to seal the piston to the corresponding back curve has been applied, the piston stops moving downward, sliding upwards relative to the primary support beam as it continues to descend.

At the full extent of the primary support beam overstroke, the piston vacuum is drawn by an external vacuum pump attached via the connection hose 254 and the internal bore 224, producing a vacuum therein and gripping the back curve 33. Once the piston-back curve coupling has been effected, the primary housing 252 begins to retract upward, pulling the pistons 218a,218b upward, disengaging the manifold 204 from the pallet 30, and ultimately freeing the registration pins 236 from the registration holes in the pallet. The empty pallet, now free to move, is motively transferred from beneath the mold assembly station and is replaced by a pallet containing a set of front curve mold halves that have been filled with a predetermined amount of monomer.

Once the front curve pallet has been properly positioned in the assembly station 250, the response servo motor 77 begins lowering the primary support beam 252 toward the new pallet. As in the first half of the cycle, the registration pins 236 enter the pallet holes and align the pallet.

Next, the O-ring 240 of the vacuum manifold 204 seats against the pallet. After a brief period of O-ring compression, the manifold 204 stops moving. Continued downward translation of the primary support beam 252 causes the biasing springs 236 of the manifold support shafts 206 to compress, providing a constant compressive force to the O-ring, therein ensuring that it seals the manifold 204 to the pallet. As this sealing engagement is made, the primary support beam 252 continues to descend, therein causing the pistons 218a,218b to slide with respect to the now stationary vacuum manifold.

Once the sealing engagement of the manifold 204 to the pallet has been made, and prior to the imminent contact of the back curve with the dose of monomer in the front curve, a vacuum is drawn within the chamber. This vacuum is drawn in order to dissipate air bubbles which might otherwise result from dissolved gasses in the monomer or from air trapped under the descending back-curve 33. This vacuum allows the back-curve to contact and drive through the monomer at a much faster rate than could be achieved in an atmospheric pressure environment, as was previously discussed with respect to the first assembly apparatus.

It should further be noted that the vacuum drawn within each piston 218a,218b through bore 224, for gripping the back curves 33, is slightly stronger than the vacuum drawn in the chamber. The pressure within the chamber is drawn down to between 5 and 7 millibars, while the pressure in the pistons is maintained between 3 and 5 millibars. This differential insures that the back curves are retained at the tips of the pistons prior to their deposition on the monomer and the front curve mold half. The vacuum within the piston is released once all of the back curves have contacted the monomer. The continued descent of the primary support beam 252 and the pistons 218a,218b proceeds at a slower rate as the back curves travel through the monomer. The speed of the motion is reduced to ensure that the monomer flows properly, laterally and upwardly, and fully engulfs the region between the curve halves. The slowed pace of descent also permits the excess monomer to escape from between the curves. This excess monomer creates a HEMA ring which is parted from the fabricated lens by the parting edge of the front curve mold when the back curve mold finally seats against it.

The back curve travels through the monomer until it seats on the parting edge of the front curve. Variations in the downward stroke of the assembly at which the two curves seat against one another, necessitate an overstroke of the downward translation of the primary support beam 252. The biasing spring 222 of each piston is compressed during the overstroke, once its corresponding back curve has fully seated, therein keeping the individual pistons from damaging the assembled mold halves.

At the point of deepest descent of the primary support beam 252, once all of the back curves 33 have been seated against their respective front curves, the vacuum chamber vacuum is released. As the vacuum within the chamber is released, the pistons 218a,218b and the manifold 204 remain in position, maintaining a constant force against the coupled curves.

Once both the vacuums have been fully released, the primary support beam 252 is motively translated back to its raised position by the response servo motor 77. In so doing, the biasing springs 222 of the pistons 218a, 218b are relaxed first, followed by the raising of the pistons away from the pallet. As the primary support beam 252 continues to rise the biasing springs 226 of the support shafts 206 are relaxed as well, until the manifold itself begins to rise, therein unseating the O-rings 240 from the surface of the pallet. The last disengement during the upward stroke is the removal of the registration pin 236 from the pallet 30, after which the pallet, now filled with fully assembled lens molds, is carried out of the assembly station, to be replaced by the next pallet having a fresh set of back curves.

While the invention has been particularly shown and described with respect to the preferred embodiments thereof, it will be understood by those skilled in the art that the foregoing and other changes in form and details may be made therein without departing from the spirit and scope of the invention, which should be limited only by the scope of the appended claims.

What is claimed is:

1. An apparatus for assembling front and back curve mold parts to form a contact lens, wherein each of said front curve mold parts has been filled with a predetermined quantity of a polymerizable hydrogel, said mold parts being supplied to said apparatus on one or more pallets, said apparatus comprising:

(a) first means for transporting said pallets to said apparatus;
   (b) second means for removing said back curve mold parts from an associated pallet, and aligning said back curve mold parts with an associated front curve mold part;
   (c) a housing member for surrounding said aligned back and front curve mold parts to thereby enable a vacuum to be drawn around said parts;
   (e) a reciprocable support beam to which is coupled the housing member and the second means, wherein said back curve mold parts having been removed by said second means may be seated against said front curve mold part while said vacuum remains drawn;
   (f) a plurality of biasing springs, at least one of said biasing springs coupling the second means to the support beam, and a second one of said springs coupling the housing member to the support beam, whereby the housing member and the second means may each move independently of the support beam to enable said back curve mold part to be seated on said front curve mold part with a predetermined pressure.

2. An apparatus as claimed in claim 1 where said pallet includes registration holes to cooperate with registration guides of the housing member to register said pallet prior to assembly of said mold parts.

3. An apparatus as claimed in claim 2 wherein said pallet includes a perimeter seal area to cooperate with a perimeter seal of said housing member to enable said vacuum to be drawn.

4. An apparatus as claimed in claim 1 wherein said one or more pallets comprises a plurality of pallets including a first set of pallets for said back curve mold parts, and a second set of pallets for said front curve mold parts, wherein each pallet of the first set is interleaved with a pallet of the second set.

5. An apparatus as claimed in claim 1 wherein said second means, the housing member, and said support beam reciprocate in the same direction.

6. An apparatus as claimed in claim 1, wherein said second means includes a separate reciprocating member for each back curve mold part carried in said pallet.

7. An apparatus as claimed in claim 6, wherein said at least one biasing spring separately couples each reciprocating member to said support beam to allow independent reciprocation of each reciprocating member while under said predetermined pressure, wherein each of said reciprocating members is separately biased by one of said plurality of biasing springs.

8. An apparatus as claimed in claim 4, wherein said apparatus cycles between picking up said back curve mold part from one of said first set of pallets and depositing said back curve mold part on said front curve mold part in one of said second set to thereby assemble said front and back curve mold parts.

9. An apparatus as claimed in claim 1 wherein said biasing spring between said housing member and said support beam establishes a predetermined seating force between said housing and said pallet when said beam reciprocates downward, which predetermined seating force seals said housing to said pallet while said vacuum remains drawn.

10. An apparatus for assembling front and back curve mold parts to form a contact lens, wherein each of said front curve mold parts has been filled with a predetermined quantity of a polymerizable hydrogel, said mold parts being supplied to said apparatus on one or more pallets, said apparatus comprising:

(a) means for transporting said pallets to said apparatus, wherein a first set of said pallets contains said front curve mold parts and a second set of pallets contains back curve mold parts;
   (b) a plurality of elongate elements for removing said back curve mold parts from an associated second pallet, and aligning said back curve mold parts with associated front curve mold parts on a first pallet;
   (c) a housing member for surrounding said aligned back and front curve mold parts to thereby enable a vacuum to be drawn around said parts;
   (d) a reciprocable support structure to which is coupled the housing member and the elongate elements, wherein said back curve mold parts having been removed from one of said second pallets by said elongate elements may be seated against said front curve mold part while said vacuum remains drawn;
   (e) a first plurality of resilient biasing elements, at least one of said first biasing elements coupling each of said elongate elements to the support structure; and
   (f) at least one second resilient biasing element coupling the housing member to the support structure, whereby the housing member may move independently of the support structure;

whereby the elongate elements, the support structure, and the housing member may reciprocate independently from one another such that selected maximum contact pressures are not exceeded.

11. An apparatus for assembling front and back curve mold parts to form a contact lens, wherein each of said front curve mold parts has been filled with a predetermined quantity of a polymerizable hydrogel, said mold parts being supplied to said apparatus on one or more pallets, said apparatus comprising:

(a) first means for transporting said pallets to said apparatus;
   (b) second means for removing said back curve mold parts from an associated pallet, and aligning said back curve mold parts with an associated front curve mold part;
   (c) a housing member for surrounding said aligned back and front curve mold parts to thereby enable a chamber vacuum to be drawn around said parts, said housing member having a top and an underside;

(d) third means for reciprocating said second means and said back curve mold parts along an axis to seat said back curve mold part against said front curve mold part with a predetermined pressure while said chamber vacuum remains drawn;

(e) at least one vacuum sleeve assembly mounted in said housing member, said sleeve assembly surrounding said second means to enable a chamber vacuum to be maintained within the housing member as the second means reciprocates within said sleeve assembly and said housing member; and (f) a clamping means to hold said back curve mold parts to said front curve molds parts at a predetermined pressure.

12. An apparatus as claimed in claim 11, wherein said at least one vacuum sleeve assembly for maintaining said chamber vacuum comprises:

(a) a sleeve element fitted within an opening defined by the top of said housing member, which opening extends from an upper surface of said top of said housing member through to an underside of said upper surface, said sleeve element defining an interior passage through the top of said housing member in which said second means may reciprocate;

(b) at least one outer O-ring sealingly disposed between an outer perimeter surface of the sleeve element and an adjacent inner perimeter surface of the opening; and (c) at least one inner O-ring sealingly disposed between the interior passage of said sleeve element, about a perimeter thereof, and an outer perimeter of the second means, said at least one inner O-ring being capable of preventing leakage into said chamber vacuum as the second means reciprocates within said sleeve element.

13. An apparatus as claimed in claim 11, wherein said second means comprises at least one elongate element having an internal plenum which is open at an end of the elongate element, in which plenum a gripping vacuum may be drawn for gripping said mold parts and removing said mold parts from an associated pallet.

14. An apparatus as claimed in claim 11, wherein said second means comprises at least one elongate element having an internal bore, in which bore a gripping vacuum may be drawn through one end of said elongate element for gripping said mold parts at the other end of said element and removing said mold parts from an associated pallet.

15. An apparatus as claimed in claim 13, wherein said at least one elongate element further comprises at least one radial bore from its side to the plenum, through which at least one radial bore an external vacuum may draw the gripping vacuum.

16. An apparatus as claimed in claim 15, wherein said housing member comprises at least one annular chamber passageway conduit defined within said housing member, which at least one passageway may be coupled at a first end to said external vacuum and at a second end to said at least one radial bore of said elongate element, through which conduit the gripping vacuum of the elongate element may be drawn.

17. An apparatus as claimed in claim 16, wherein said second means further comprises a plurality of elongate elements, each of which grips one of said mold parts.

18. An apparatus as claimed in claim 17, wherein said at least one vacuum sleeve assembly for maintaining said chamber vacuum further comprises a plurality of vacuum sleeve assemblies.

19. An apparatus as claimed in claim 18, wherein each one of said plurality of elongate elements reciprocates in a corresponding one of said plurality of vacuum sleeve assemblies, each of said vacuum sleeve assemblies comprising:

(a) a sleeve element fitted within an opening in said housing member, said sleeve element defining an interior passage through which the corresponding one of said elongate elements is translated, and said sleeve element further having at least one lateral orifice through which corresponding ones of said plurality of annular chamber passageway of the housing member and the at least one radial bore of said elongate element are connected, so that said external vacuum may draw said gripping vacuum in said plenum, (b) at least two outer O-rings being disposed about a perimeter of said sleeve element between the outer surface of the sleeve element and an adjacent inner surface of the opening of the housing member, a first of said outer O-rings being positioned between the top of the housing member and a first connection of the at least one lateral orifice of said sleeve element and the corresponding annular chamber passageway, and a second of said outer O-rings being positioned between said underside of the housing member and the first connection; and (c) at least two inner O-rings being disposed about an inner perimeter of said sleeve element between the outer surface of said elongate element and an adjacent inner surface of said sleeve element, a first of said inner O-rings being disposed between the top of the housing member and a second connection of the at least one radial bore of the elongate element and the lateral orifice of the sleeve element, and a second inner O-ring being disposed between the underside of the housing member and the second connection, said inner O-rings being capable of maintaining sealing engagement with both the sleeve element and the elongate element as the elongate element reciprocates with respect to said sleeve element;

whereby leakage of ambient atmosphere into the gripping vacuum or the chamber vacuum is prevented during reciprocation of the elongate elements within the sleeve assemblies.

20. An apparatus as claimed in claim 19 further comprising a plurality of inner and outer annular grooves in the corresponding inner and outer surface of said sleeve element in which the pluralities of inner and outer O-rings are disposed.

21. An apparatus as claimed in claim 19, wherein the at least one lateral orifice of the sleeve element comprises an external annular passageway which provides for a rotationally independent connection of the at least one radial bore of the elongate element and the annular chamber passageways of the housing member through the lateral orifice of the sleeve element.

* * * * *